United States Patent
Iwamoto et al.

(10) Patent No.: US 6,354,674 B1
(45) Date of Patent: Mar. 12, 2002

(54) HYDRAULIC CONTROL APPARATUS INTEGRATED WITH MOTOR DRIVING CIRCUIT UNIT

(75) Inventors: Masami Iwamoto; Toru Fujita, both of Obu; Nobuhiko Yoshioka, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/458,955

(22) Filed: Dec. 10, 1999

(30) Foreign Application Priority Data

| Dec. 11, 1998 | (JP) | 10-352948 |
| Dec. 11, 1998 | (JP) | 10-352949 |
| Oct. 29, 1999 | (JP) | 11-309621 |
| Oct. 29, 1999 | (JP) | 11-309622 |

(51) Int. Cl.⁷ .................................. B60T 8/36
(52) U.S. Cl. .................................... 303/119.3
(58) Field of Search .................. 303/119.3, 116.1, 303/116.4, 119.1, 119.2

(56) References Cited

U.S. PATENT DOCUMENTS

| 4,842,525 A | * | 6/1989 | Galloway et al. | 439/34 |
| 5,374,114 A | * | 12/1994 | Burgdorf et al. | 303/119.2 |
| 5,407,260 A | * | 4/1995 | Isshiki et al. | 303/119.2 |
| 5,449,227 A | * | 9/1995 | Steinberg et al. | 303/119.2 |
| 5,482,362 A | * | 1/1996 | Robinson | 303/119.2 |
| 5,766,026 A | * | 6/1998 | Cooper et al. | 439/76.1 |
| 5,779,221 A | * | 7/1998 | Staib et al. | 251/129.15 |
| 5,785,394 A | * | 7/1998 | Volpe et al. | 303/119.2 |
| 5,820,228 A | * | 10/1998 | Schneider et al. | 303/119.3 |
| 5,842,753 A | * | 12/1998 | Staib et al. | 303/119.2 |
| 5,921,639 A | * | 7/1999 | Hosoya | 303/119.2 |
| 5,941,282 A | * | 8/1999 | Suzuki et al. | 137/884 |
| 6,000,679 A | * | 12/1999 | Reuter et al. | 251/129.15 |
| 6,048,041 A | * | 4/2000 | Mueller et al. | 303/119.2 |
| 6,059,382 A | * | 5/2000 | Schoettl | 303/119.3 |
| 6,120,114 A | * | 9/2000 | Blazic et al. | 303/119.2 |
| 6,148,855 A | * | 11/2000 | Rauner et al. | 137/560 |
| 6,164,732 A | * | 12/2000 | Tominaga et al. | 303/119.2 |
| 6,186,603 B1 | * | 2/2001 | Park | 303/119.3 |

* cited by examiner

Primary Examiner—Christopher P. Schwartz
Assistant Examiner—Benjamin A Pezzlo
(74) Attorney, Agent, or Firm—Pillsbury Winthrop

(57) ABSTRACT

A hydraulic control apparatus integrated with motor circuit unit, in which waterproof for preventing liquid such as water from entering an electronic substrate or the like accommodated in a circuit unit housing can be efficiently performed. A hydraulic control apparatus is provided with a hydraulic unit for adjusting brake fluid pressure, and a motor driving circuit unit for actuating a motor for adjusting the brake fluid pressure and integrally assembled with the hydraulic unit. An ECU for controlling the brake fluid pressure is separately provided from the motor driving circuit unit. The motor driving circuit unit is provided with a circuit unit housing constructed by a case portion made of resin and a cover made of resin. The circuit unit housing is divided into an electronic substrate portion for accommodating an electronic substrate, and an operation portion for accommodating a solenoid and a pressure sensor by partition walls provided at the case portion and the cover. The cover is bonded with the case portion by vibrating welding so that the cover is integrated with the cover. As a result, it can prevent water from entering into the circuit unit housing. Particularly, the electronic substrate portion is completely waterproofed by the partition walls and the cover.

28 Claims, 23 Drawing Sheets

WELDING AREA

HYDRAULIC CONTROL APPARATUS INTEGRATED WITH MOTOR DRIVING CIRCUIT UNIT

CROSS REFERENCE TO RELATED APPLICATION

This application is based upon Japanese Patent Application Nos. Hei. 10-352948 filed on Dec. 11, 1998, Hei. 10-352949 filed on Dec. 11, 1998, Hei. 11-309621 filed on Oct. 29, 1999, and Hei. 11-309622 filed on Oct. 29, 1999, the contents of which are incorporated herein by reference.

BACKGROUND OF THE INVENTION

1. Field of the Invention

This invention relates to hydraulic control apparatuses, and particularly to a hydraulic control apparatus in which a motor driving large current circuit unit is integrally assembled with a hydraulic unit.

2. Related Art

Conventionally, a hydraulic unit for adjusting wheel cylinder pressure for performing an anti-skid control. (ABS control or antilock braking system control) or the like, an ECU (electronic control unit) for controlling the hydraulic unit, and a motor driving circuit for actuating a motor such as a pump motor for adjusting brake fluid pressure, are mounted on a vehicle.

Recently, some kinds of apparatuses are designed as module-type to simplify manufacturing steps or to make the apparatus more compact. It is thought to design a module apparatus, in which the hydraulic unit for the ABS control and the ECU are integrally assembled.

For example, it is thought that a housing (a circuit unit housing) made of resin, which accommodates the motor driving circuit unit such as the motor driving circuit and an electronic substrate for controlling a motor actuation, is assembled to an aluminum alloy housing accommodating the hydraulic unit. (First example)

In this case, as shown in FIG. 7, a not-shown solenoid is inserted to a lower portion of a case portion P4 of the circuit unit housing P3; an electronic substrate P2 is assembled to an upper portion of the case portion P4; and then an opening portion of the upper portion of the case portion P4 is covered with a cover P5 so as to seal the circuit unit housing P3. Next, the circuit unit housing P3 is arranged on a hydraulic unit housing P1, and the circuit unit housing P3 is fixed to the hydraulic unit housing by screws P6.

However, when such the hydraulic control apparatus integrated with motor circuit unit is assembled by the above-described steps, the following inconvenience may occur.

That is, it needs to provide a waterproof to the circuit unit housing P3 so that water may not touch the electronic substrate P2 accommodated in the circuit unit housing P3.

For example, when the cover P5 is assembled to the case portion P4, silicon is filled up at an assembling portion so that the case portion P4 is connected with the cover P5 and that silicon performs the waterproof of gaps between the case portion P4 and the cover P5.

Furthermore, a not-shown waterproof packing is provided at a bottom surface of an outer wall P7 of the lower portion of the case portion P4 so as to waterproof between the case portion P4 and the hydraulic unit housing P1. Furthermore, one part of a partition wall P8 of the case portion P4 where a terminal from the solenoid penetrates is waterproofed by filling up silicon, so as to waterproof a lower portion and an upper portion of the partition wall 8 of the case portion P4.

However, such the waterproof steps for protecting the electronic substrate P2 from liquid such as water may lower productivity.

Furthermore, it is thought that a housing (an ECU housing) made of resin, which accommodates solenoid for actuating a electromagnetic valve, an electronic substrate or the like, is assembled to an aluminum alloy housing accommodating the hydraulic unit such as a hydraulic circuit. (Second example)

However, in the case of the second example, the electronic substrate is arranged above the solenoid, and then the electronic substrate is assembled and electrically connected with the solenoid in the ECU housing. Therefore, the electronic substrate needs to be connected after the solenoid is assembled to the hydraulic unit housing. Hence, there would be lack of flexibility for manufacturing steps, and as a result, it may reduce productivity because it is difficult to rearrange or divide the manufacturing steps.

Furthermore, in the case of the second example, when the ECU includes a large current circuit, the following inconvenience may occur. That is, 1) noise due to the large current may cause harmful influence to the other signals; 2) it needs to have a harness for the large current to supply power from the ECU to the solenoid; 3) size of the ECU becomes large; and as a result, 4) throughput of the substrate may be decreased. Therefore, it is preferable to form the hydraulic unit and the motor driving large current circuit in one module, and to separately form the ECU from to the hydraulic unit and the motor driving large current circuit. However, total volume of the module and ECU may increase.

Furthermore, water entering into a motor driving circuit housing or being generated as a result of condensation causes breakdown, rust or erosion. Therefore, it needs to remove such water immediately. However, in the case of the water, since water may adhere on a drain path due to surface tension, it needs to enlarge a size of the drain path and a size of the housing may increase.

SUMMARY OF THE INVENTION

This invention has been conceived in view of the background thus far described and its first object is to provide a hydraulic control apparatus, in which waterproof can be efficiently performed.

Its second object is to provide a hydraulic control apparatus, in which waterproof for preventing liquid such as water from touching an electronic substrate or the like accommodated in a housing of a motor driving circuit unit can be efficiently performed.

Its third object is to provide a hydraulic control apparatus, of which manufacturing steps has flexibility enough to assemble an electronic substrate at early stage.

Its fourth object is to provide downsized hydraulic control apparatus, in which a hydraulic unit is integrated with and a motor driving large current circuit.

According to one aspect of the present invention, since an electronic substrate portion, which accommodates an electronic substrate for controlling a pressure generating actuator for generating the brake fluid pressure, is separated from the operation portion, the waterproof of the electronic substrate portion can be easily performed.

According to another aspect of the present invention, an electronic substrate portion is arranged so as to transversally offset with respect to the operation portion. Therefore, the operation portion and the electronic substrate portion are manufactured separately. Thus, since the flexibility of the manufacture increases, the electronic substrate can be assembled at early stage.

According to another aspect of the present invention, a hydraulic unit has a hydraulic unit housing for accommodating a hydraulic mechanism including valves, and the hydraulic unit housing of the hydraulic unit housing includes a valve arrange portion at which the valves are concentrated. Here, a terminal line is connected to the pressure generating actuator by being penetrated through the hydraulic unit housing, and has a shape to detour around the valve arrange portion of the hydraulic unit housing. Therefore, it can reduce an interval between each valve and therefore downsize the total volume because this structure can efficiently use spaces compared to the case where the valves are dispersively arranged.

According to another aspect of the present invention, a hydraulic unit has a channel groove at a portion where the circuit unit housing is confronted with in the hydraulic unit, the channel groove is partly opened to the operation portion and is directly or indirectly communicated with a ventilating opening positioned at a bottom surface of the hydraulic control apparatus.

In this case, almost all the path for draining liquid from the operation portion can be defined as the channel groove. Therefore, the circuit unit housing may have a part of the path or may no path therein. Hence, it can prevent the circuit unit housing from becoming large scale.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

First Embodiment

A hydraulic control apparatus integrated with motor circuit unit of a first embodiment of the present invention and assemble steps of the same will be explained hereinafter with reference to the accompanying drawings.

A) First of all, a structure of the hydraulic control apparatus will be explained with reference to the accompanying drawings.

Figure 1:
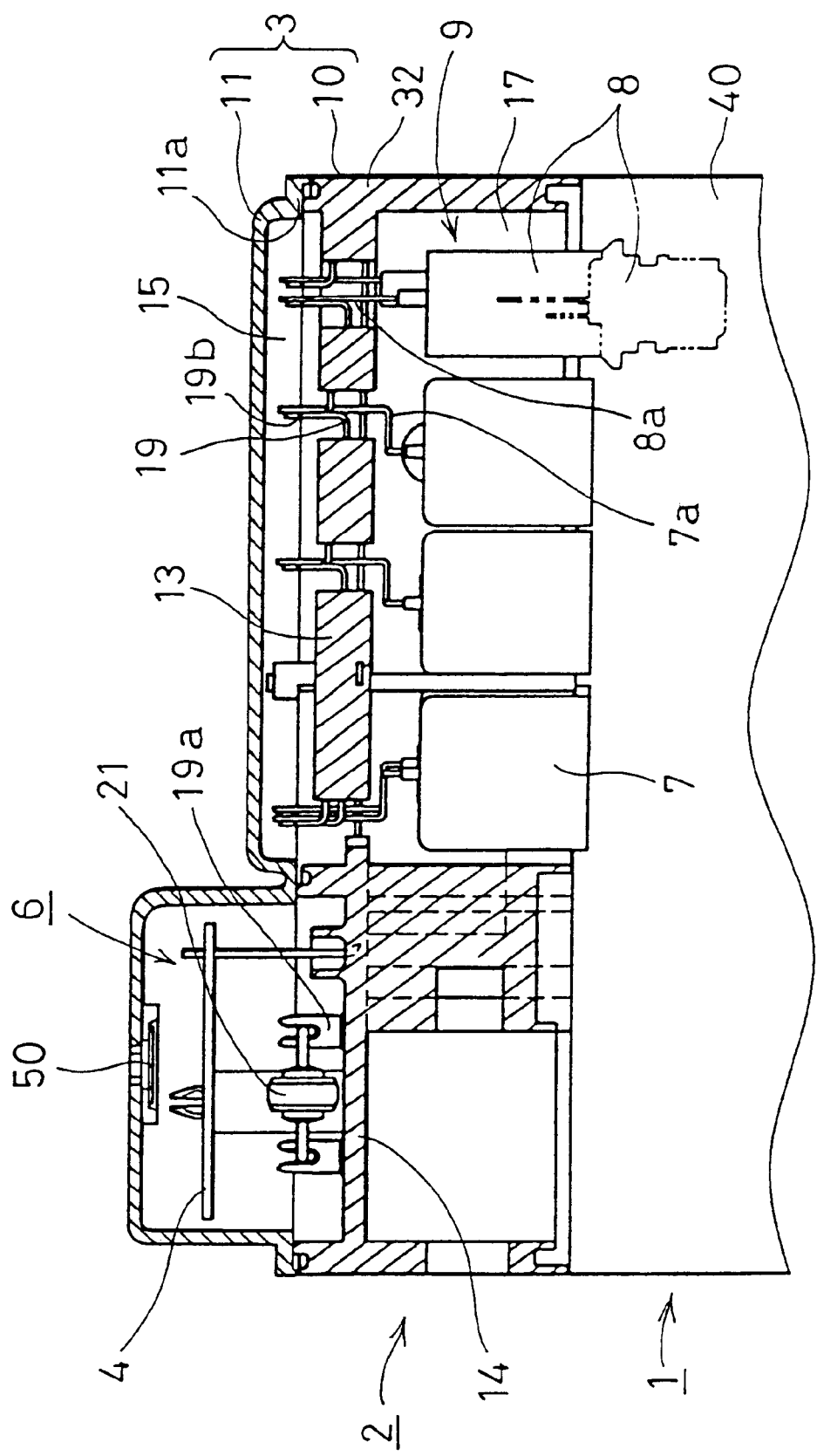
FIG. 1 is a sectional view of a hydraulic control apparatus of a first embodiment according to the present invention.
Figure 2:
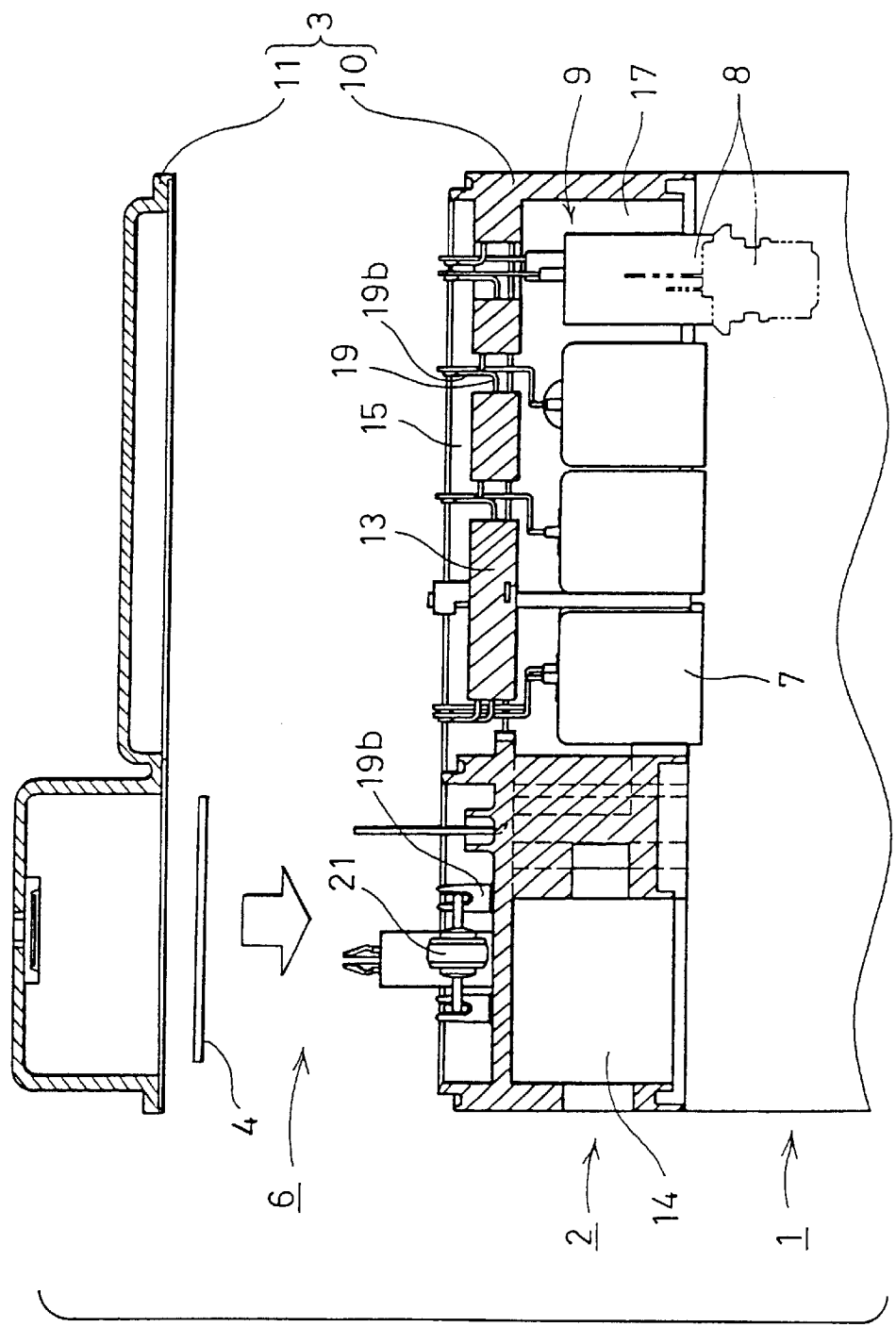
FIG. 2 is a sectional view of a disassembled hydraulic control apparatus of the first embodiment.

As shown in FIGS. 1, 2, the hydraulic control apparatus is provided with a hydraulic unit 1 for adjusting brake fluid pressure such as wheel cylinder pressure for performing a vehicle control such as an anti-skid control (ABS control), and a motor driving circuit unit 2 for actuating a motor or the like for adjusting the brake fluid pressure. The hydraulic unit 1 and the motor driving circuit unit 2 are integrally assembled. Here, in this embodiment, an ECU as a control device for performing some kinds of calculations for controlling the brake fluid pressure is separately provided from the motor driving circuit unit 2. For example, the ECU is separately mounted in an engine room or a passengers component.

The motor driving circuit unit 2 is provided with a housing (circuit unit housing) 3. The circuit unit housing 3 is constructed by a case portion 10 made of resin and has a box-shape, and a cover 11 made of resin for covering over an opening of the case portion 10.

An electronic substrate portion 6 for accommodating an electronic substrate 4 for controlling a motor actuation, and an operation portion 9 for accommodating an electronic control actuator such as a solenoid 7 as an electrical actuator and a pressure sensor 8 are provided in the circuit unit housing 3. Particularly, the electronic substrate portion 6 and the operation portion 9 are arranged in substantially parallel in a transverse direction in FIGS. 1, 2 so as to transversally offset.

Here, each part will be explained in detail.

A-1) The operation portion 9 side in the case portion 10 of the circuit unit housing 3 (right side of FIGS. 1, 2) is divided into a first block 15 at an upper side (the cover 11 side) and a second block 17 at a lower side (the hydraulic unit 1 side) by a partition wall 13, which substantially horizontally extends.

The electronic substrate portion 6 side (left side of FIGS. 1, 2) in the case portion 10 is also divided into the electronic substrate portion 6 side at the upper side and the lower side (merely space) by a partition wall 14, which substantially horizontally extends.

A bus bar 19, which is made of a plurality of conductive metal plate such as copper plate, is provided in the partition walls 13, 14. The bus bar 19 has edge portions 19a, 19b for connection. Each of the edge portions 19a, 19b has vertical portion extending upwardly in FIGS. 1, 2.

The bus bar 19 is used for large current circuit (for example, 12 V, 80 A). A terminal of an electronic parts 21 such as diode as an electronic element is connected to the edge portion 19a of the bus bar 19 in the electronic substrate portion 6 by pressure-bonding. A terminal 7a from the solenoid 7 or a terminal 8a from the pressure sensor 8 is connected to the edge portion 19b of the bus bar 19 in the first block 15 by resistance welding.

Furthermore, the electronic substrate 4 is mounted on the electronic substrate portion 6 so as to cover an electronic parts 21 mounted on the bus bar 19.

Here, at one part of the cover 11 covering a chamber 11 as the electronic substrate portion 6, a filter 50 for preventing water from externally entering to the chamber is provided so as to release moisture from the chamber.

Figure 3:
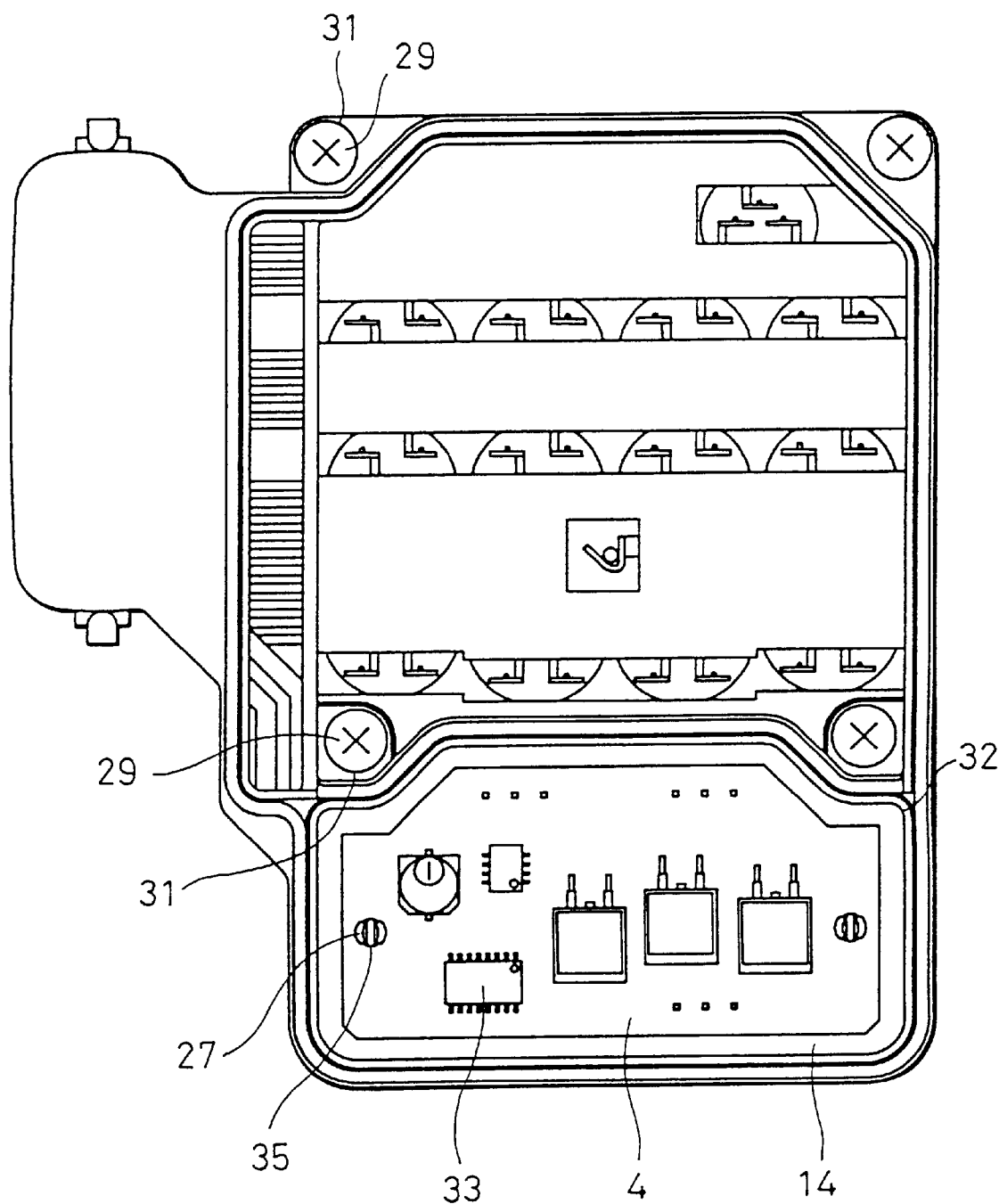
FIG. 3 is a plan view illustrating inside of the hydraulic control apparatus of the first embodiment when a cover is opened.

As shown in FIG. 3, a plurality of electronic parts 33 such as an IC for controlling or semiconductor relay are mounted on the electronic substrate 4. Hocking holes 35, to which hooking portions 27 upwardly extending from the partition wall 14 are to be hocked, are provided at two opposite peripheral portions of the electronic substrate 4.

Furthermore, through holes 31, to which screw members 29 as inside screws are to be inserted, are provided at two opposite peripheral portions (at lower portion in FIG. 3) of the operation portion 9. Through holes 31, to which screw members 29 as outside screws are to be inserted, are provided at two opposite peripheral portions (at upper portion in FIG. 3) of the case portion 10.

Figure 4:
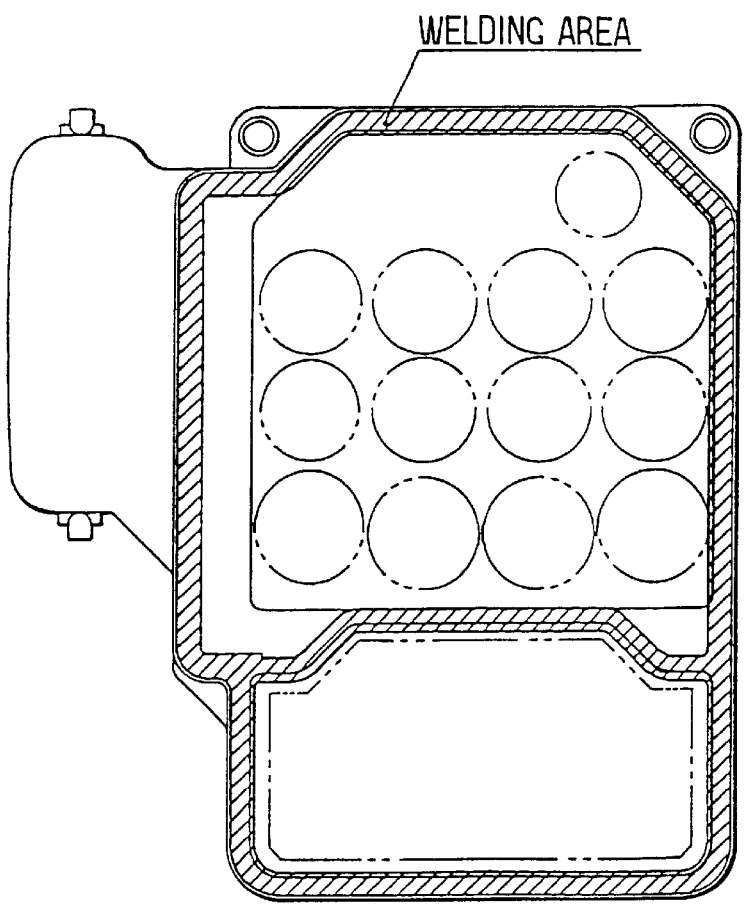
FIG. 4 is a plan view illustrating vibrating welding area of the first embodiment.

A wall 32 having a substantially 8-shape (double ring shape) in a plane is provided at a surrounding portion of the electronic substrate portion 6 and a surrounding portion of the first block 15. As shown in FIG. 1, a bottom surface of a surrounding portion 11a of the cover 11 and a top surface of the wall 32 are bonded together by vibrating welding. In FIG. 4, area to be vibrating welded is shown by hatched portion, and this area corresponds to the substantial 8-shape region described the above.

Particularly, in this embodiment, the surrounding portion of the electronic substrate portion 6 and the surrounding portion of the first block 15 are formed in special shape to perform the vibrating welding.

Figure 5A:
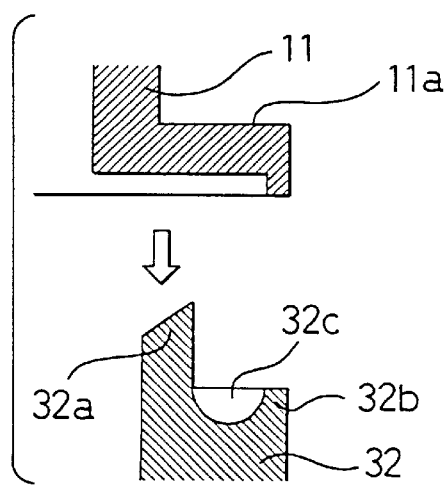
FIG. 5A is a sectional view illustrating a pair of portions where to be vibrating-welded, before being vibrating-welded of the first embodiment.
Figure 5B:
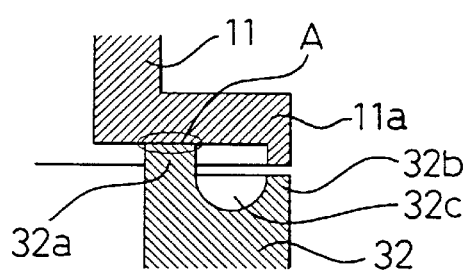
FIG. 5B is a sectional view illustrating a pair of portions where to be vibrating-welded, after being vibrating-welded of the first embodiment.

Concretely, as shown in FIG. 5A, the surrounding portion 11a of the cover 11 is externally protruded largely, and has a bottom surface having a substantially zonal flat surface. On the contrary, a top end of the wall 32 of the case portion 10 is formed so that an inside convex portion 32a is longer than an outside convex portion 32b. A top end of the inside convex portion 32 is cut to have oblique surface. A concave portion 32c is formed at center portion between the inside convex portion 32a and the outside convex portion 32b.

Therefore, when the case portion 10 is covered with the cover 11 and the vibrating welding is performed by vibrating the cover 11 transversely or in back-and-forth (normal direction of the drawing), the inside convex portion 32a of the wall 32 is flatten by being soften and worn away by frictional heat, and bonded with the bottom surface of the surrounding portion 11a of the cover 11 at a bonding surface A. Here, worn-out resin is collected in the concave portion 32. Here, there is a small gap (for example, approximately 0.5 mm) between the bottom surface of the surrounding portion 11a of the cover 11 and the outside convex portion 32b of the wall 32.

Therefore, the electronic substrate portion 6 is separated (isolated) and waterproofed from the other portions by vibrating welding the case portion 10 with the cover 11 at the surrounding wall 32 of the electronic substrate portion 6.

On the contrary, as shown in FIGS. 1, 4, twelve sets of the solenoid 7 and one pressure sensor 8 are arranged in the second block 17. The solenoids 7 and the pressure sensor 8 are fixed to the hydraulic unit housing 40 by caulking. Here, the solenoids 7 are electrical actuators or actuating not-shown electromagnetic valves in the hydraulic unit 1, and the pressure sensor 8 is a sensor for detecting brake fluid pressure in a not-shown hydraulic circuit.

A-2) Next, the cover 11 will be briefly explained. As shown in FIG. 1, the cover 11 is made up of one portion to cover the electronic substrate portion 6 and another portion to cover the first block 15 of the operation portion 9, and is upwardly provided with a wall 11a having the same shape as the wall 32 having the substantially 8-shape of the case portion 10.

Therefore, the cover 11 is integrated with the case 10 by bonding the cover 11 to an upper opening portion of the case portion 10 so as to cover the upper opening portion with the cover 11.

Since the case portion 10 and the cover 11 are integrated each other, it can prevent liquid such as water from entering into the circuit unit housing 3. Particularly, the surrounding portion of the electronic substrate portion 6 is completely waterproofed by the partition wall 14, the wall 32 and the cover 11.

A-3) Next, the hydraulic unit 1 will be briefly explained. The hydraulic unit 1 is provided with the hydraulic unit housing 40 for accommodating a hydraulic mechanism such as a not-shown hydraulic circuit or a not-shown electromagnetic valve. The hydraulic unit housing 40 is a substantially box-shaped container made of aluminum alloy.

The solenoids 7 and the pressure sensor 8 are fixed to the upper surface side of the hydraulic unit housing 40 by caulking.

B) Manufacturing steps or assembling steps of the hydraulic control apparatus integrated with motor circuit unit will be explained with reference to FIGS. 6A to 6D, which show the manufacturing steps.

Figure 6A:
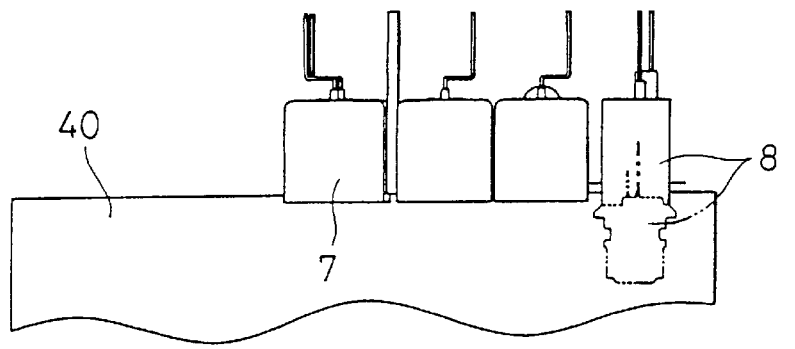
FIGS. 6A–6D are diagrams illustrating assemble steps of the hydraulic control apparatus of the first embodiment.

B-1) As shown in FIG. 6A, the solenoids 7 and the pressure sensor 8 are fixed to the upper surface side of the hydraulic unit housing 40 by caulking.

Figure 6B:
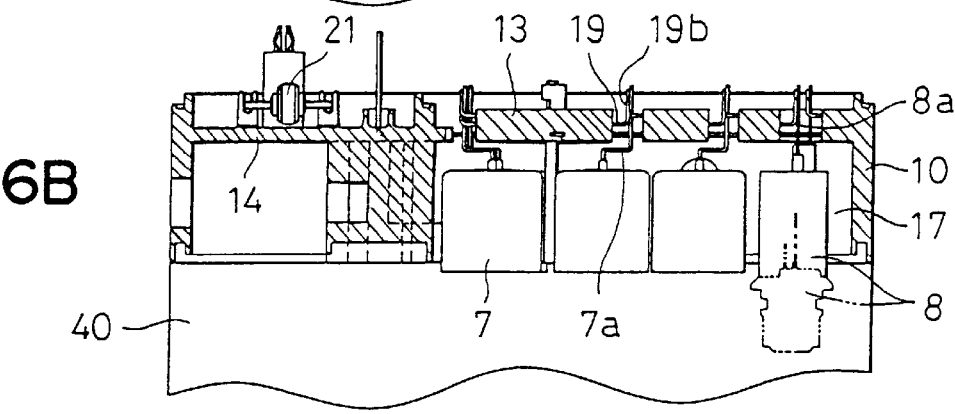

B-2) As shown in FIG. 6B, the case portion 10 is arranged on the upper surface of the hydraulic unit housing 40 so that the solenoids 7 and the pressure sensor 8 are accommodated in the second block 17 of the case portion 10. As a result, the edge portion 19b of the bus bar 19 is approached or contacted with the solenoids 7 and the terminals 7a, 8a of the pressure sensor 8. Here, bus bar is integrally assembled in the partition walls 13, 14 of the case portion 10 when the case portion 10 is manufactured.

B-3) Next, the screw members 29 are inserted into the through holes 31 of the case portion 10, and being screwed up the screw members 20 to the not-shown screw holes of the hydraulic unit housing. Thus, the case portion 10 is fixed to the upper surface of the hydraulic unit housing 40.

Here, the electronic parts 21 as the electronic element may be assembled to the bus bar 19 before the case portion 10 is fixed to the hydraulic unit housing 40, or assembled to the bus bar 19 after the case portion 10 is fixed to the hydraulic unit housing 40.

B-4) Next, the edge portion 19b of the bus bar 19 are bonded to the solenoids 7 and the terminals 7a, 8a of the pressure sensor 8 by resistance welding so as to electrically connect each other.

Figure 6C:
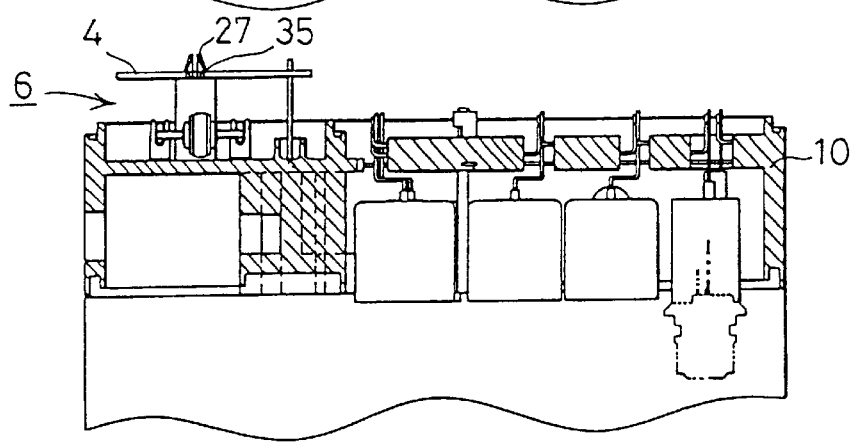

B-5) As shown in FIG. 6C, the electronic substrate 4 is assembled with the electronic substrate portion 6 so as to cover the electronic element. In other words, the electronic substrate 4 is fixed to the upper surface side of the case portion 10 by putting the hooking portions 27 provided to the case portion 10 into the hooking holes 35 of the electronic substrate 4.

B-6) Next, the case portion 10 and the hydraulic unit 1 are lifted at the same time, and are soaked into a not-shown tank accommodating dripproof agent so that the dripproof agent is adhered on the electronic substrate 4.

B-7) The electronic substrate 4 on which the dripproof agent is adhered is loaded on a not-shown drying apparatus with the case portion 10 and the hydraulic unit 1 so as to dry up the dripproof agent.

Figure 6D:
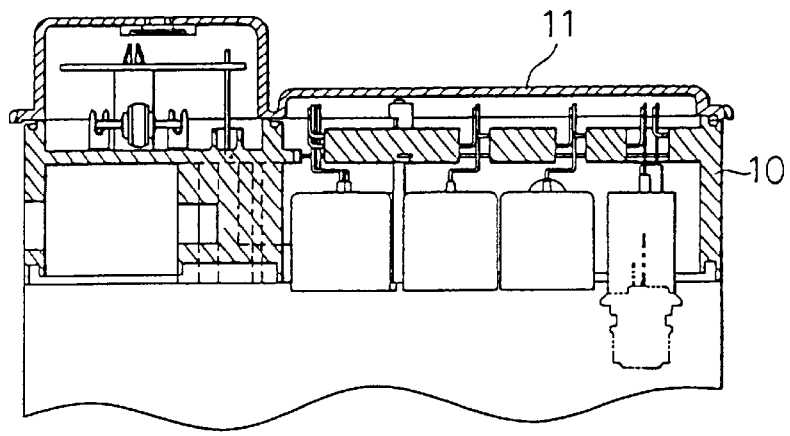
Figure 7:
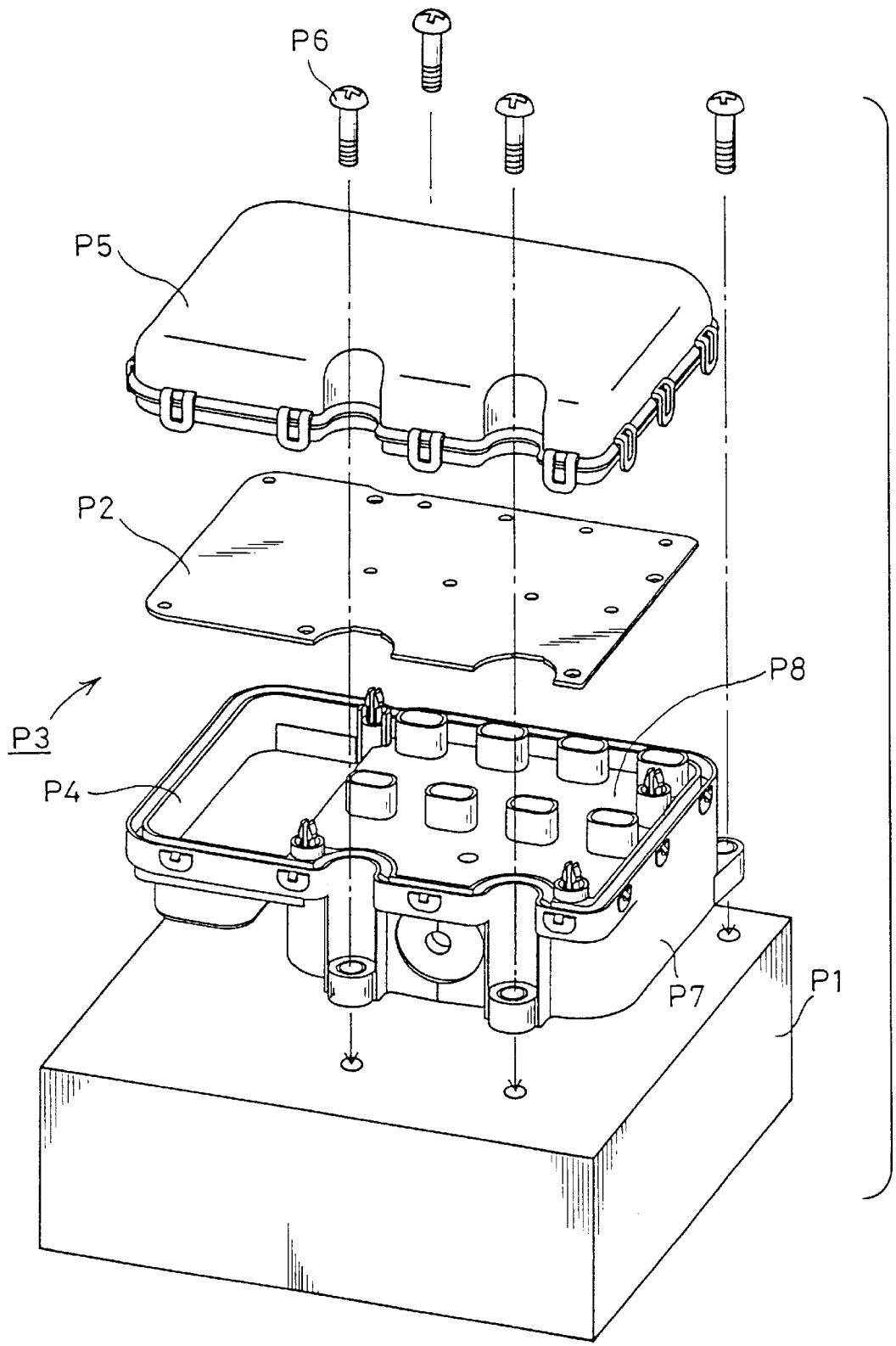
FIG. 7 is a perspective view illustrating assemble steps to form a module according to a related art.

B-8) After that, the whole hydraulic apparatus is unloaded from the drying apparatus. As shown in FIG. 6D, the cover 11 is putted on the upper surface side of the case portion 10 to cover the upper surface, and the cover 11 is integrated with the cover 11 by vibrating welding.

As described the above, the vibrating welding is performed by putting the cover 11 on the case portion 10, and vibrating transversely or in back-and-forth while the cover 11 is pressed so as to generate the friction heat to weld each other.

Thus, the hydraulic control apparatus integrated with motor circuit unit in which the hydraulic unit 1 is integrated with the motor driving circuit unit 2 is completed.

According to this embodiment, since the electronic substrate portion 6 accommodating the electronic substrate 4 and so on is separated (isolated) from the other portion, and since cover 11 and the case portion 10 is bonded together by putting the cover 11 on the case portion 10 and by bonding by vibrating welding, the bonding steps are largely simplified, and the waterproof of the electronic substrate portion can be easily performed.

Since the electronic substrate portion 6 is waterproofed at the same time as vibrating welding, it does not need to provide additional waterproof packing or the like.

Furthermore, in this embodiment, the electronic control unit (ECU) separately provided from the motor driving circuit (i.e., bus bar 19), that is, the bus bar 19 or a motor driving substrate for large current circuit, which provides large current to the motor, is provided at the case portion 10 or the like of the circuit unit housing 3. Therefore, the following merits can be obtained.

1) When the ECU includes a large current circuit, noise due to the large current may influence to other signals. However, since the large current circuit is integrated with the actuator (motor) side, but not ECU side, such noise to the ECU can be prevented.

2) Since it is not necessary to have a large current harness between the case portion and the ECU, it can reduce the cost and noise.

3) The ECU can become compact, and be lightened.

4) The throughput of the substrate can be improved.

Here, the present invention should not limited to the above-mentioned preferred embodiment. For example, the case portion 10 may fixed to the hydraulic unit housing 40 after the electronic substrate 4 is assembled to the case portion 10 in stead of the above-mentioned assembling steps. In this case, since it does not need to lift up such a bulky and heavy hydraulic unit 1 during the step for spreading the dripproof agent on the electronic substrate 4 or the step for drying up the dripproof agent, productivity for assembling can be increased and working area can be reduced.

Second Embodiment

A hydraulic control apparatus integrated with motor circuit unit of a second embodiment of the present invention and assemble steps will be explained hereinafter with reference to the accompanying drawings.

A) First of all, a structure of the hydraulic control apparatus will be explained with reference to the accompanying drawings.

Figure 8:
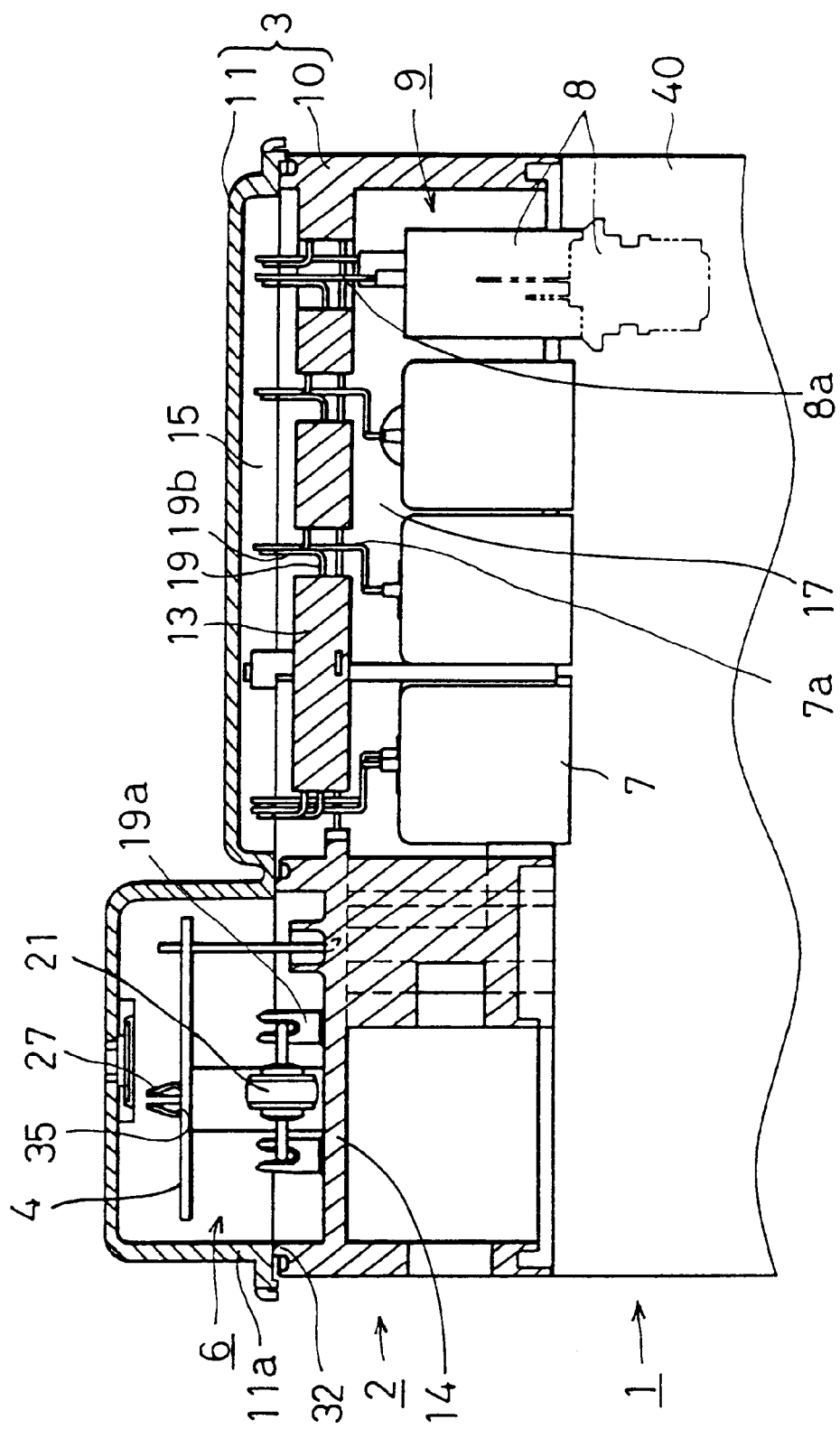
FIG. 8 is a sectional view of a hydraulic control apparatus of a second embodiment according to the present invention.
Figure 9:
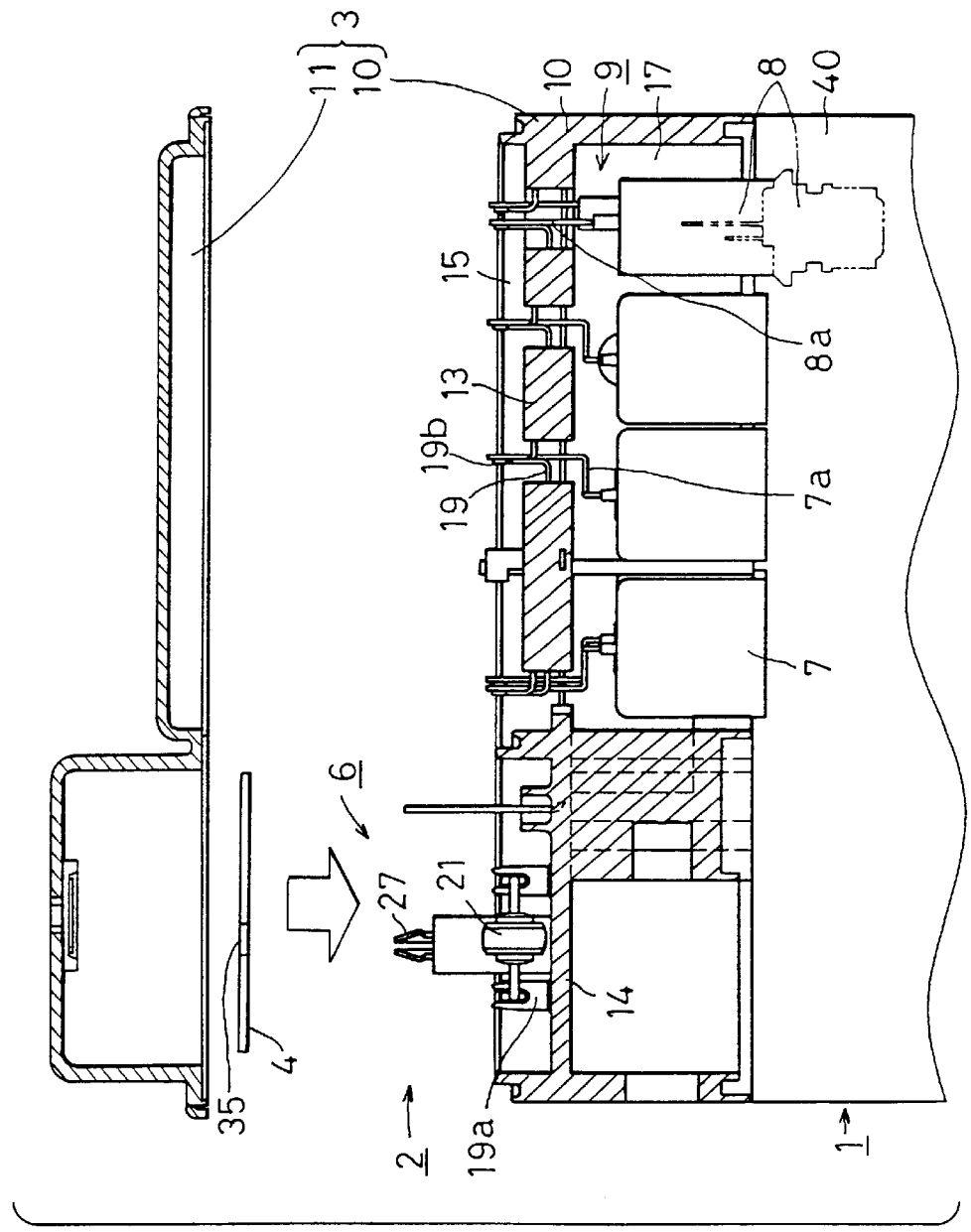
FIG. 9 is a sectional view of a disassembled hydraulic control apparatus of the second embodiment.

As shown in FIGS. 8, 9, the hydraulic control apparatus is provided with a hydraulic unit 1 for adjusting brake fluid pressure such as wheel cylinder pressure for performing a vehicle control such as an anti-skid control (ABS control), and a motor driving circuit unit 2 for actuating a motor or the like for adjusting the brake fluid pressure. The hydraulic unit 1 and the motor driving circuit unit 2 are integrally assembled. Here, in this embodiment, an ECU as a control device for performing some kinds of calculations for controlling the brake fluid pressure is separately provided from the motor driving circuit unit 2.

The motor driving circuit unit 2 is provided with a housing (circuit unit housing) 3. The circuit unit housing 3 is constructed by a case portion 10 made of resin and has a box-shape, and a cover 11 made of resin for covering over an opening of the case portion 10.

An electronic substrate portion 6 for accommodating an electronic substrate 4 for controlling a motor actuation, and an operation portion 9 for accommodating a solenoid 7 as an electrical actuator and a pressure sensor 8 are provided in the circuit unit housing 3. Particularly, the electronic substrate portion 6 and the operation portion 9 are arranged in substantially parallel in a transverse direction in FIGS. 8, 9 so as to transversally offset. Here, a not-shown motor and a not-shown pump are not transversally offset, because an arranging direction and an arranging position of the motor and the pump are different from those of the solenoid 7 and the pressure sensor 8.

Here, each part will be explained in detail.

A-1) The operation portion 9 side in the case portion 10 of the circuit unit housing 3 (right side of FIGS. 8, 9) is divided into a first block 15 at an upper side (the cover 11 side) and a second block 17 at a lower side (the hydraulic unit 1 side) by a partition wall 13, which substantially horizontally extends.

The electronic substrate portion 6 side (left side of FIGS. 8, 9) in the case portion 10 is also divided into the electronic substrate portion 6 side at the upper side and the lower side (merely space) by a partition wall 14, which substantially horizontally extends.

A bus bar 19, which is made of a plurality of conductive metal plate such as copper plate, is provided in the partition walls 13, 14. The bus bar 19 has edge portions 19a, 19b for connection. Each of the edge portions 19a, 19b has vertical portion extending upwardly in FIGS. 8, 9.

The bus bar 19 is used for large current circuit (for example, 12 V, 80 A). A terminal of an electronic parts 21 such as diode as an electronic element is connected to the edge portion 19a of the bus bar 19 in the electronic substrate portion 6 by pressure-bonding. A terminal 7a from the solenoid 7 or a terminal 8a from the pressure sensor 8 is connected to the edge portion 19b of the bus bar 19 in the first block 15 by resistance welding.

Furthermore, the electronic substrate 4 is mounted on the electronic substrate portion 6 so as to cover an electronic parts 21 mounted on the bus bar 19.

Figure 10:
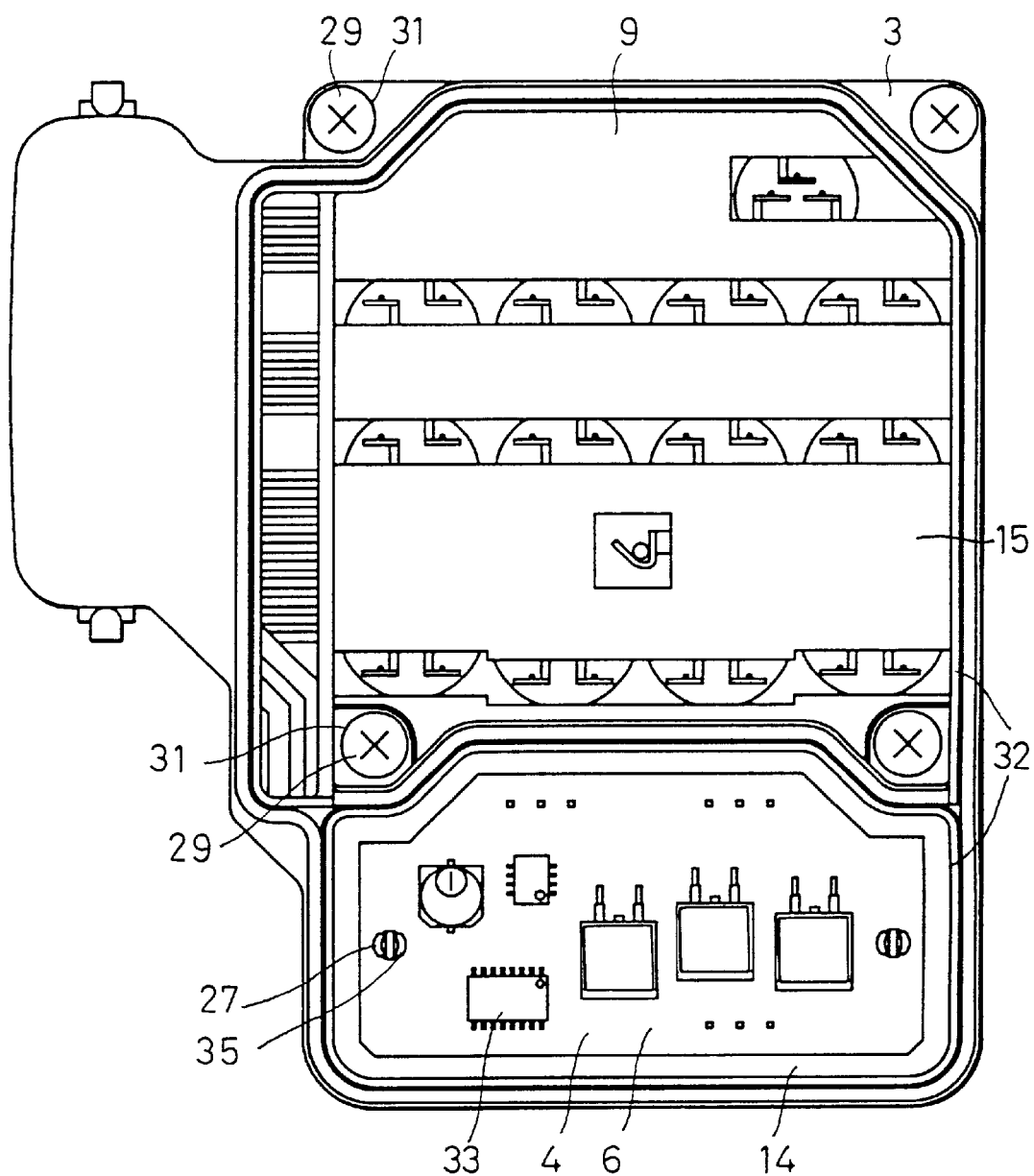
FIG. 10 is a plan view illustrating inside of the hydraulic control apparatus of the second embodiment when a cover is opened.

As shown in FIG. 10, a plurality of electronic parts 33 such as an IC for controlling or semiconductor relay are mounted on the electronic substrate 4. Hocking holes 35, to which hooking portions 27 upwardly extending from the partition wall 14 are to be hocked, are provided at two opposite peripheral portions of the electronic substrate 4.

Furthermore, through holes 31, to which screw members 29 as inside screws are to be inserted, are provided at two opposite peripheral portions (at lower portion in FIG. 10) of the operation portion 9. Through holes 31, to which screw members 29 as outside screws are to be inserted, are provided at two opposite peripheral portions (at upper portion in FIG. 10) of the case portion 10.

A wall 32 having a substantially 8-shape (double ring shape) in a plane is provided at a surrounding portion of the electronic substrate portion 6 and a surrounding portion of the first block 15. As shown in FIG. 8, a bottom surface of a surrounding portion 11a of the cover 11 and a top surface of the wall 32 are bonded together by vibrating welding.

On the contrary, as shown in FIGS. 8, 11, twelve sets of the solenoid 7 and one pressure sensor 8 are arranged in the second block 17. The solenoids 7 and the pressure sensor 8 are fixed to the hydraulic unit housing 40 by caulking. Here, the solenoids 7 are electrical actuators or actuating not-shown electromagnetic valves in the hydraulic unit 1, and the pressure sensor 8 is a sensor for detecting brake fluid pressure in a not-shown hydraulic circuit.

A-2) Next, the cover 11 will be briefly explained. As shown in FIG. 8, the cover 11 is made up of one portion to cover the electronic substrate portion 6 and another portion to cover the first block 15, and is upwardly provided with a wall 11a having the same shape as the wall 32 having the substantially 8-shape of the case portion 10.

Therefore, the cover 11 is integrated with the case 10 by bonding the cover 11 to an upper opening portion of the case portion 10 so as to cover the upper opening portion with the cover 11.

Since the case portion 10 and the cover 11 are integrated, it can prevent liquid such as water from entering into the circuit unit housing 3. Particularly, the surrounding portion of the electronic substrate portion 6 is completely waterproofed by the partition wall 14, wall 32, and cover 11.

A-3) Next, the hydraulic unit 1 will be briefly explained. The hydraulic unit 1 is provided with the hydraulic unit housing 40 for accommodating a hydraulic mechanism such as a not-shown hydraulic circuit or a not-shown electromagnetic valve. The hydraulic unit housing 40 is a substantially box-shaped container made of aluminum alloy.

The solenoids 7 and the pressure sensor 8 are fixed to the upper surface side of the hydraulic unit housing 40 by caulking.

B) Next, a manufacturing steps or assembling steps of the hydraulic control apparatus integrated with motor circuit unit will be explained with reference to FIGS. 11A to 11D, which show the manufacturing steps.

Figure 11A:
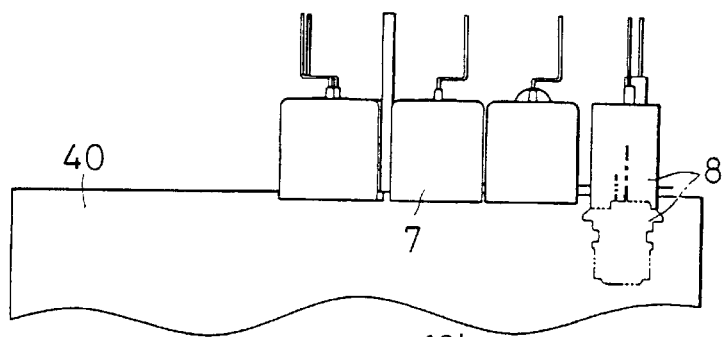
FIGS. 11A–11D are diagrams illustrating assemble steps of the hydraulic control apparatus of the second embodiment.
Figure 11B:
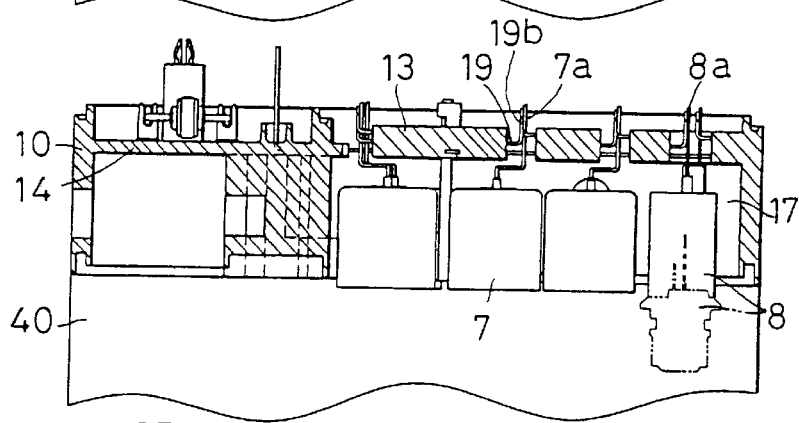
Figure 11C:
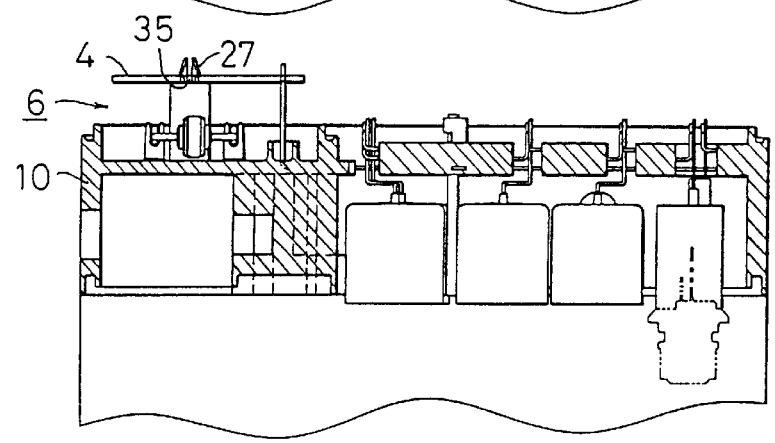
Figure 11D:
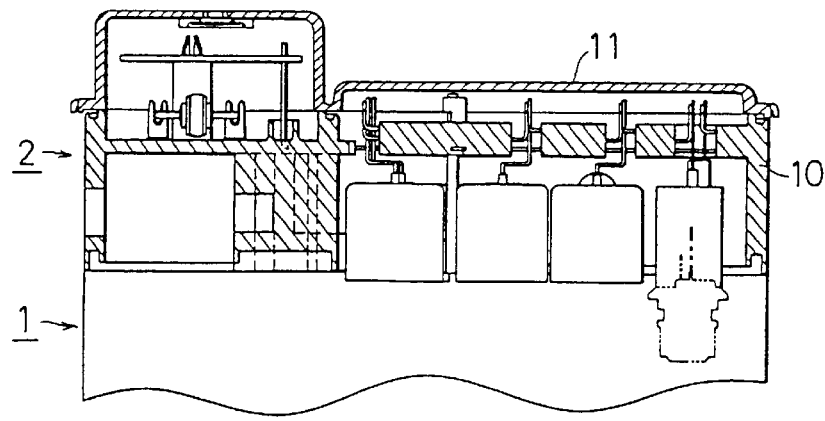
Figure 12A:
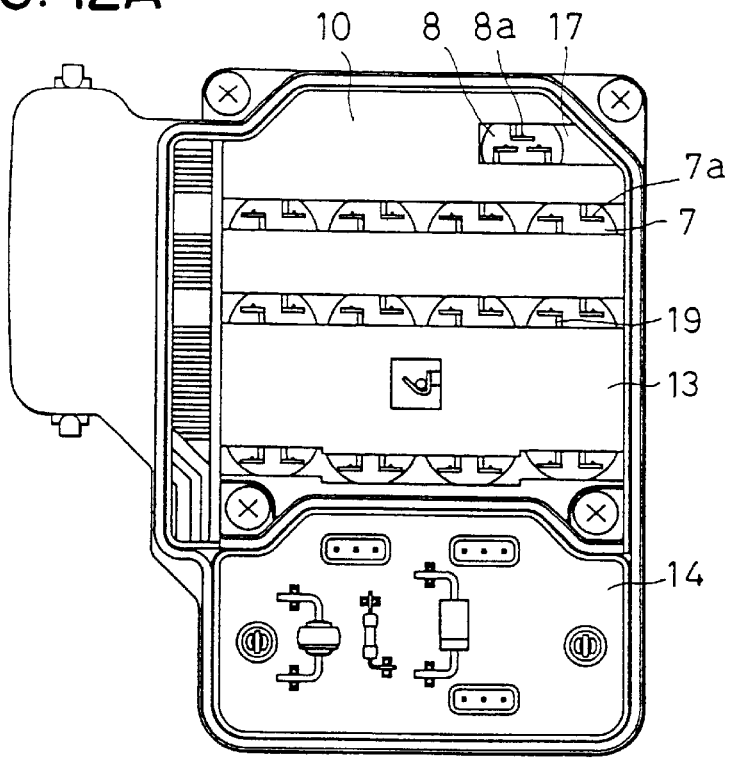
FIG. 12A is a plan view illustrating assemble step of the hydraulic control apparatus at step of FIG. 11B.
Figure 12B:
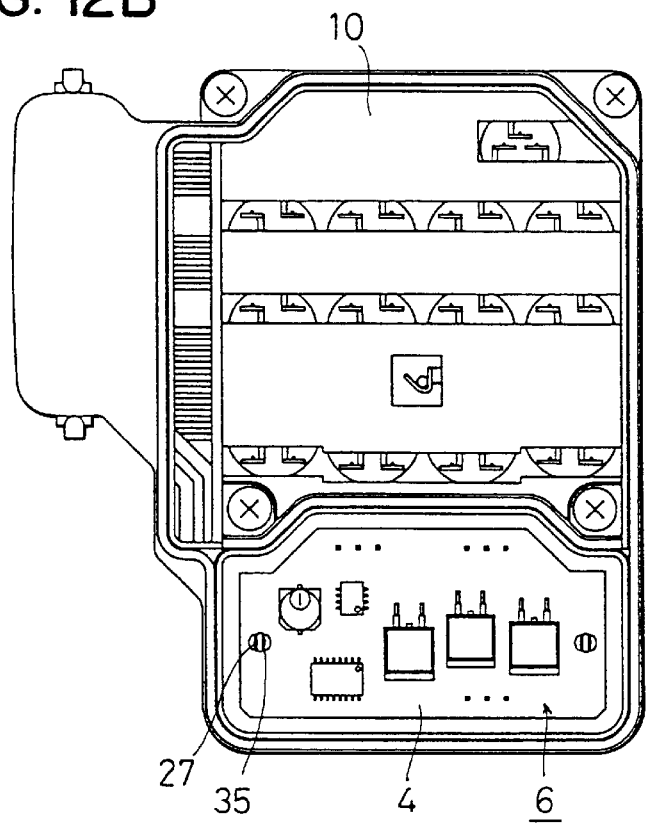
FIG. 12B is a plan view illustrating assemble step of the hydraulic control apparatus at step of FIG. 11C.

Here, FIG. 12A is a plan view at step of FIG. 11B, and FIG. 12B is a plan view at step of FIG. 11C;

B-1) As shown in FIG. 11A, the solenoids 7 and the pressure sensor 8 are fixed to the upper surface side of the hydraulic unit housing 40 by caulking.

B-2) As shown in FIGS. 11B and 12A, the case portion 10 is arranged on the upper surface of the hydraulic unit housing 40 so that the solenoids 7 and the pressure sensor 8 are accommodated in the second block 17 of the case portion 10. As a result, the edge portion 19b of the bus bar 19 is approached or contacted with the solenoids 7 and the terminals 7a, 8a of the pressure sensor 8. Here, bus bar is integrally assembled in the partition walls 13, 14 of the case portion 10 when the case portion 10 is manufactured.

B-3) Next, the screw members 29 are inserted into the through holes 31 of the case portion 10, and being screwed up the screw members 20 to the not-shown screw holes of the hydraulic unit housing. Thus, the case portion 10 is fixed to the upper surface of the hydraulic unit housing 40.

Here, the electronic parts 21 as the electronic element may be assembled to the bus bar 19 before the case portion 10 is fixed to the hydraulic unit housing 40, or assembled to the bus bar 19 after the case portion 10 is fixed to the hydraulic unit housing 40.

B-4) Next, the edge portion 19b of the bus bar 19 are bonded to the solenoids 7 and the terminals 7a, 8a of the pressure sensor 8 by resistance welding so as to electrically connect each other.

B-5) As shown in FIGS. 11C and 12B, the electronic substrate 4 is assembled at the electronic substrate portion 6 so as to cover the electronic element. That is, the electronic substrate 4 is fixed to the upper surface side of the case portion 10 by putting the hooking portions 27 provided to the case portion 10 into the hooking holes 35 of the electronic substrate 4.

B-6) Next, the case portion 10 and the hydraulic unit 1 are lifted at the same time, and are soaked into a not-shown tank accommodating dripproof agent so that the dripproof agent is adhered on the electronic substrate 4.

B-7) The electronic substrate 4 on which the dripproof agent is adhered is loaded on a not-shown drying apparatus with the case portion 10 and the hydraulic unit 1 so as to dry up the dripproof agent.

B-8) After that, the whole hydraulic apparatus is unloaded from the drying apparatus. As shown in FIG. 6D, the cover 11 is putted on the upper surface side of the case portion 10 to cover the upper surface, and the cover 11 is integrated with the cover 11 by vibrating welding.

Thus, the hydraulic control apparatus integrated with motor circuit unit in which the hydraulic unit 1 is integrated with the motor driving circuit unit 2 is completed.

According to first and second embodiment, the operation portion 9, in which the solenoid 7 and the pressure sensor 8 are accommodated, and the electronic substrate portion 6, in which the electronic substrate 4 is accommodated, are arranged so as to transversally offset. Therefore, the operation portion 9 and the electronic substrate portion 6 can be manufactured separately. Thus, since the flexibility of the manufacture increases, the electronic substrate 4 can be assembled at early stage as shown in later third embodiment. Furthermore, since only the electronic substrate portion 6 is water-tightly formed, it can enhance waterproof performance.

Third Embodiment

In this embodiment, since the structure of the hydraulic control apparatus integrated with motor circuit unit is substantially the same as that of first embodiment, and the method of assembling is largely different from the first embodiment, the method of assembling will be mainly explained with reference to FIGS. 13A–13D, 14A and 14B. The same numerals refer to the same or corresponding structure.

Figure 13A:
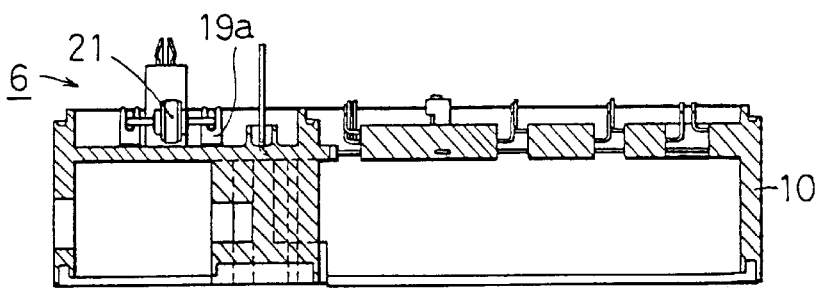
FIGS. 13A–13D are diagrams illustrating assemble steps of the hydraulic control apparatus of a third embodiment.
Figure 13B:
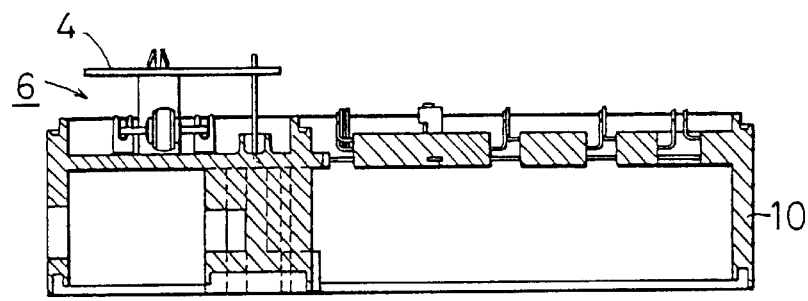
Figure 13C:
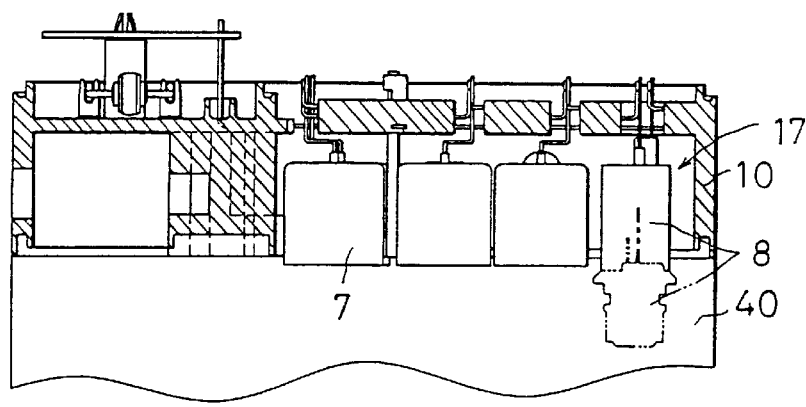
Figure 13D:
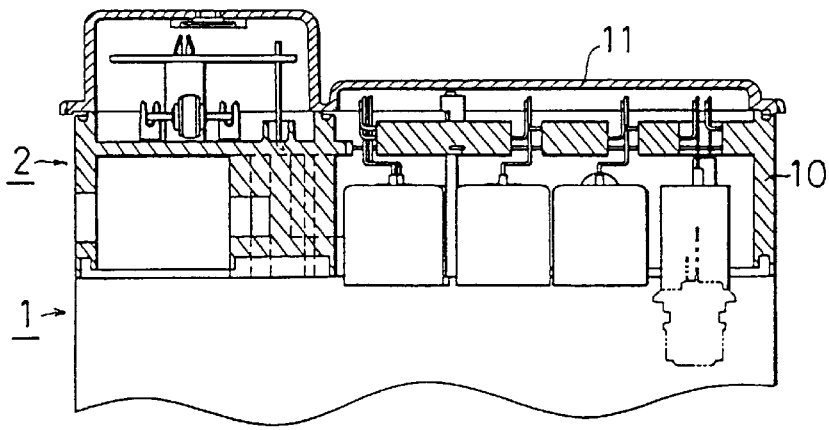
Figure 14A:
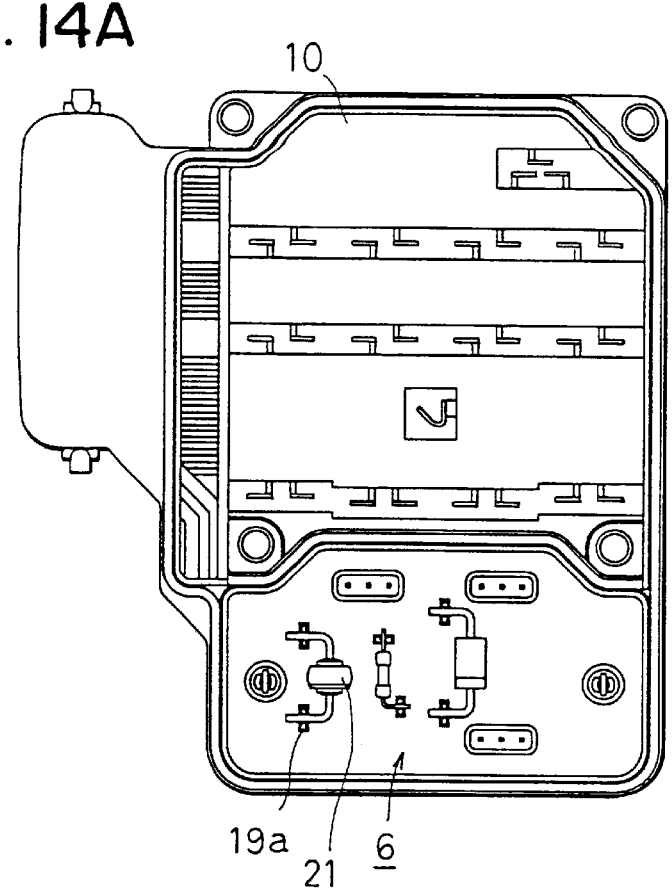
FIG. 14A is a plan view illustrating assemble step of the hydraulic control apparatus at step of FIG. 13A.
Figure 14B:
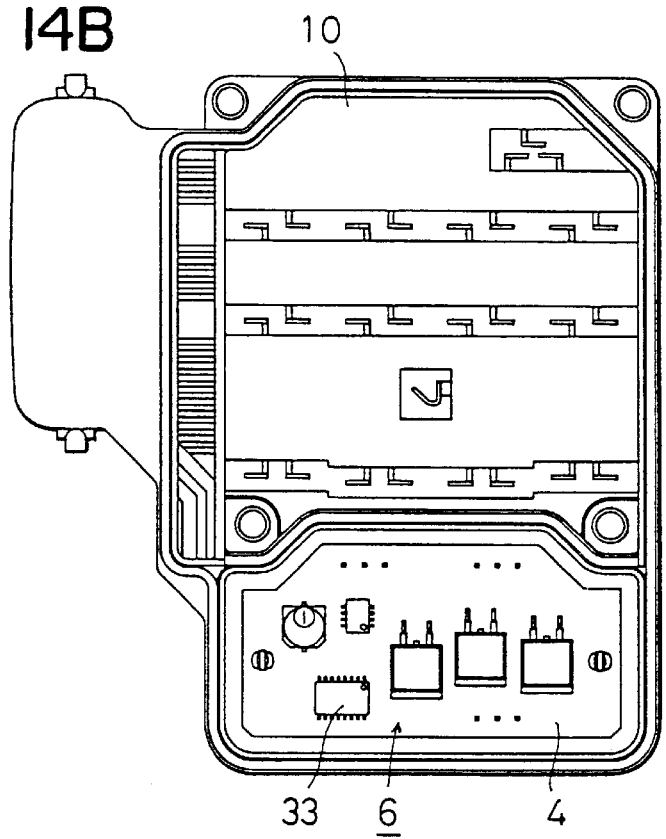
FIG. 14B is a plan view illustrating assemble step of the hydraulic control apparatus at step of FIG. 13B.

FIGS. 13A–13D shows assemble (manufacturing) steps, and FIGS. 14A, 14B are plan views illustrating assemble steps at step of FIGS. 13A, 13B.

1) As shown in FIGS. 13A and 14A, the electronic parts 21 as the electronic element is assembled to the edge portion 19a of the bus bar 19 of the electronic substrate portion 6 in the case portion 10 of the circuit unit housing 3.

2) As shown in FIGS. 13B and 14B, the electronic substrate 4 is assembled at the electronic substrate portion 6 so as to cover the electronic element. Here, the electronic parts 33 such as the control IC or semiconductor relay are previously mounted on the electronic substrate 4.

3) The case portion 10 with the electronic substrate 4 is lifted, and is soaked into a not-shown tank accommodating dripproof agent so that the dripproof agent is adhered on the electronic substrate 4.

4) The electronic substrate 4 on which the dripproof agent is adhered is loaded on a not-shown drying apparatus with the case portion 10 so as to dry up the dripproof agent.

5) On the contrary, apart from the above-described steps, the solenoids 7 and the pressure sensor 8 are fixed to the upper surface of the hydraulic unit housing 40 by caulking.

6) As shown in FIG. 13C, the case portion 10 is arranged above the hydraulic unit housing 40 so that the solenoids 7 and the pressure sensor 8 are accommodated in the second block 17 of the case portion 10.

7) Next, the screw members 29 are inserted into the through holes 31 of the case portion 10, and being screwed up the screw members to the not-shown screw holes of the hydraulic unit housing. Thus, the case portion 10 is fixed to the upper surface of the hydraulic unit housing 40.

8) Next, the edge portion 19b of the bus bar 19 are bonded to the solenoids 7 and the terminals 7a, 8a of the pressure sensor 8 by resistance welding so as to electrically connect each other.

9) After that, as shown in FIG. 13D, the cover 11 is putted on the upper surface side of the case portion 10 to cover the upper surface, and the cover 11 is integrated with the cover 11 by vibrating welding.

Thus, the hydraulic control apparatus integrated with motor circuit unit in which the hydraulic unit 1 is integrated with the motor driving circuit unit 2 is completed.

According to third embodiment, the operation portion 9, in which the solenoid 7 and the pressure sensor 8 are accommodated, and the electronic substrate portion 6, in which the electronic substrate 4 is accommodated, are arranged so as to transversally offset. Therefore, the operation portion 9 and the electronic substrate portion 6 can be manufactured separately. Thus, since the flexibility of the manufacture increases, the electronic substrate 4 can be assembled at early stage. Furthermore, since only the electronic substrate portion 6 is water-tightly formed, it can enhance waterproof performance. After mounting the electronic substrate 4 on the case portion 10 of the circuit unit housing 3, the dripproof agent is spread to the electronic substrate and is dried up. Therefore, the dripproof can be performed not only at electronic substrate 4 itself but also at electrical portions of the electronic substrate 4.

In other words, in this embodiment, the case portion 10 is fixed to the hydraulic unit housing 40 after the electronic substrate 4 is fixed to the case portion 10. Therefore, when the dripproof agent is spread on the electronic substrate 4 or when the dripproof agent is dried up, such the step can be performed with just light case portion 10. That is, it does not need to lift heavy structure including the hydraulic unit 1 during such the step. Therefore, productivity for assembling can be increased and working area can be reduced.

Fourth Embodiment

Figure 15:
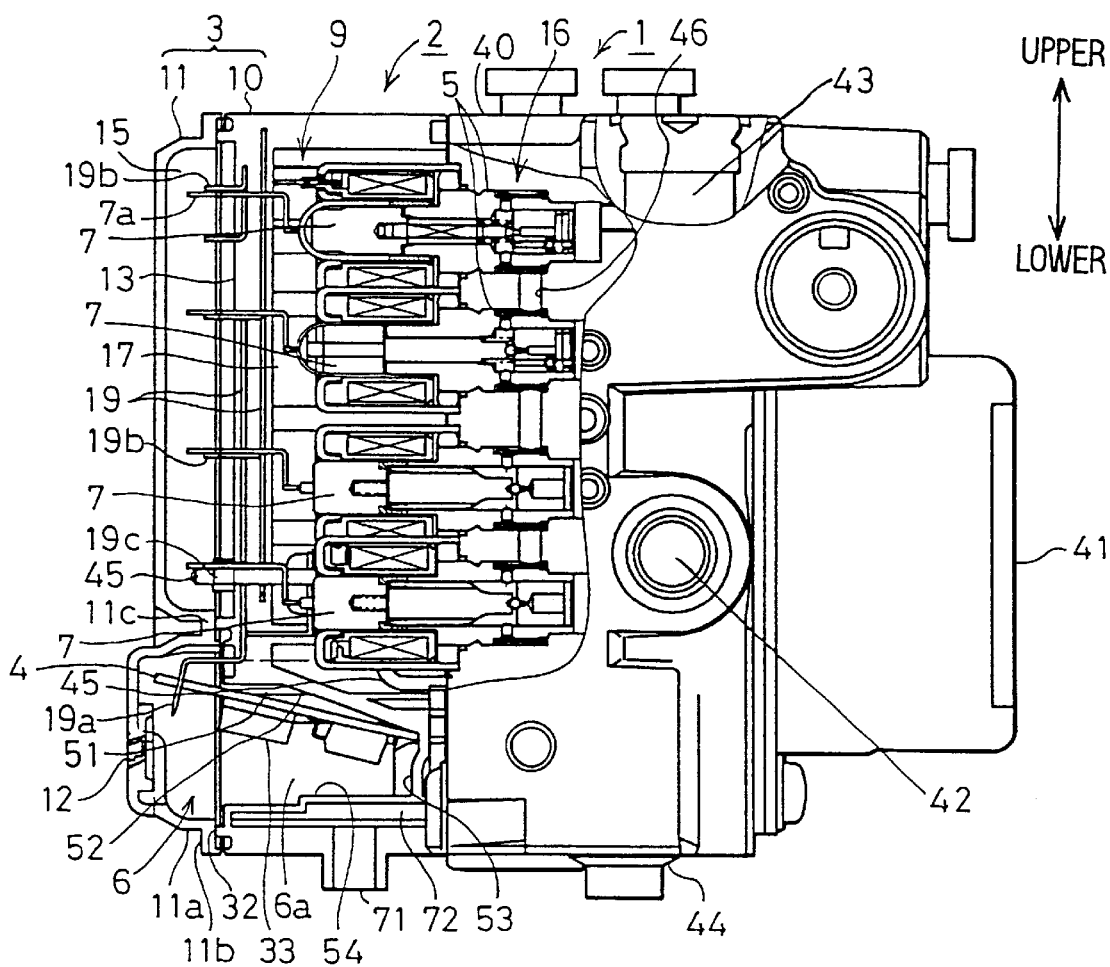
FIG. 15 is a front view (partly sectional fragmentary view) of a hydraulic control apparatus of a fourth embodiment according to the present invention.
Figure 16:
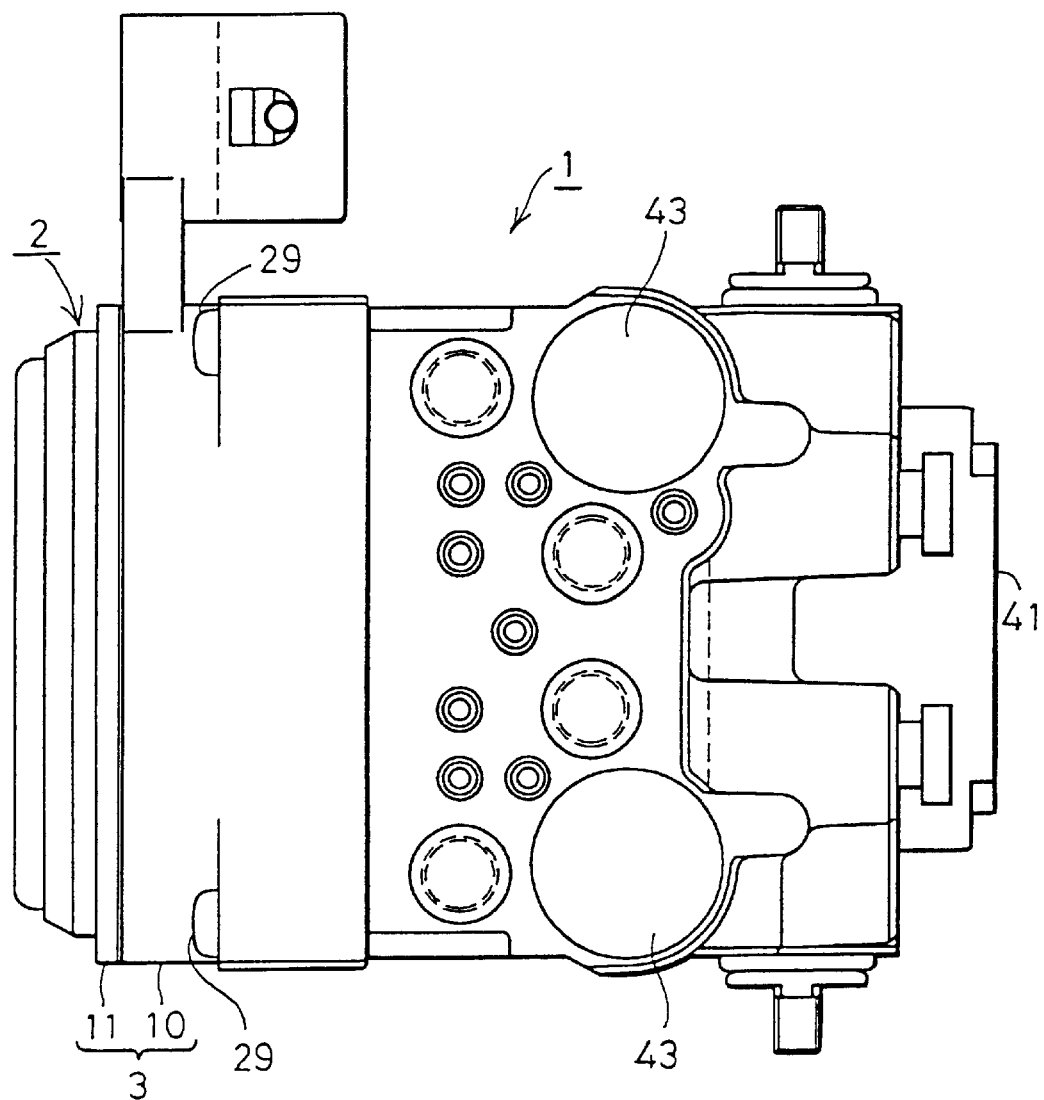
FIG. 16 is a plan view of the hydraulic control apparatus of the fourth embodiment.
Figure 17:
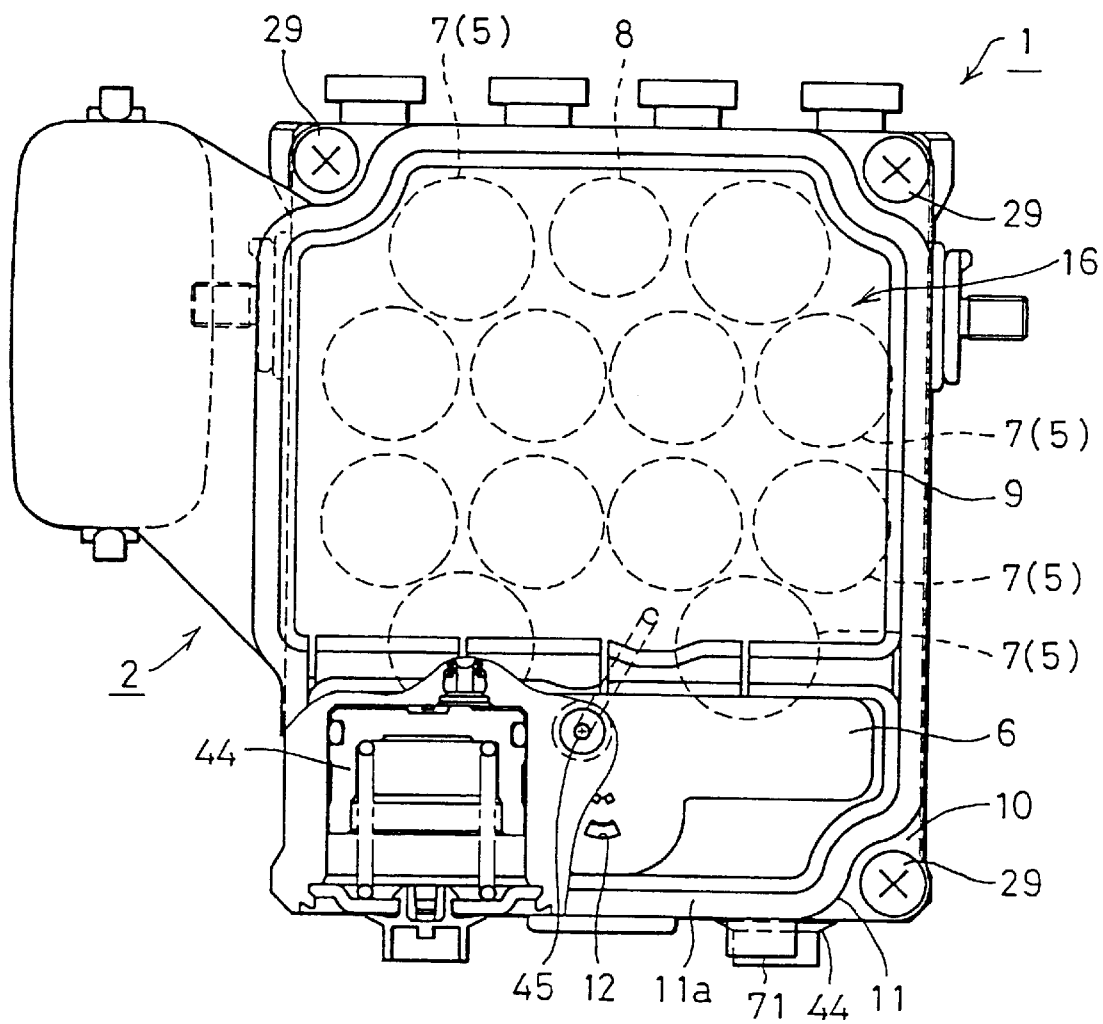
FIG. 17 is a left side view of the hydraulic control apparatus of the fourth embodiment.
Figure 18:
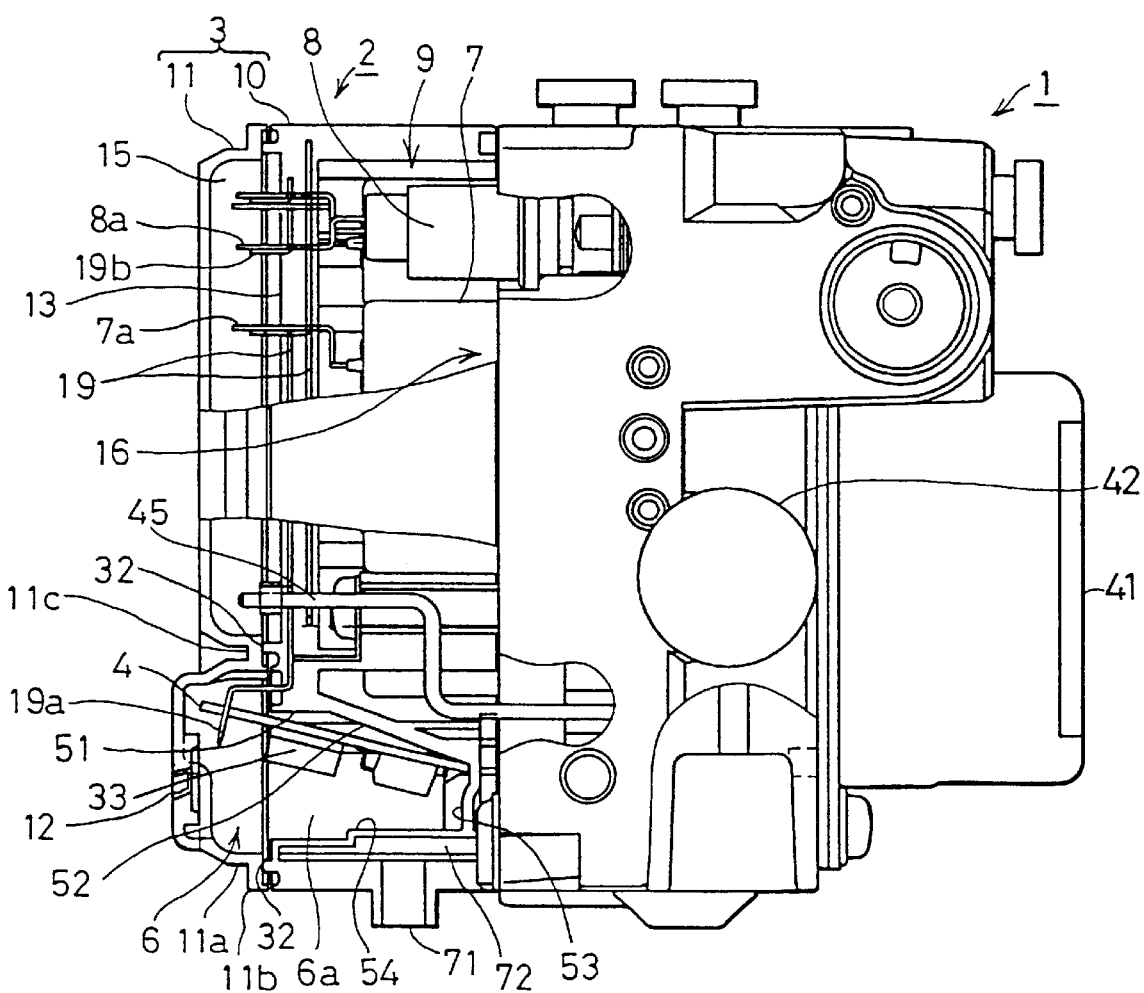
FIG. 18 is a front view (partly sectional fragmentary view) of the hydraulic control apparatus of the fourth embodiment.

A hydraulic control apparatus integrated with motor circuit unit of a fourth embodiment of the present invention will be explained hereinafter with reference to FIGS. 15 to 18. Here, FIG. 15 is a front view (partly sectional fragmentary view) of the hydraulic control apparatus; FIG. 16 is a plan view; FIG. 17 is a left side view; and FIG. 18 is a front view (partly sectional fragmentary view) fragmented at position different from FIG. 15.

As shown in FIGS. 15 to 18, the hydraulic control apparatus of this embodiment is provided with a hydraulic unit 1 for adjusting brake fluid pressure such as wheel cylinder pressure for performing a vehicle control such as an anti-skid control (ABS control), and a motor driving circuit unit (motor driving large current circuit unit) 2 for actuating a motor or the like for adjusting the brake fluid pressure. The hydraulic unit 1 and the motor driving circuit unit 2 are integrally assembled. Here, in this embodiment, an ECU as a control device for performing some kinds of calculations for controlling the brake fluid pressure is separately provided from the motor driving circuit unit 2.

The hydraulic unit 1 is provided with a pump 42 for generating brake fluid pressure, a motor 41 for driving the pump 42, dumper 43 for preventing pulsing of the brake fluid pressure, a reservoir 44 for adjusting an amount of oil in the hydraulic unit 1 and so on.

Figure 23A:
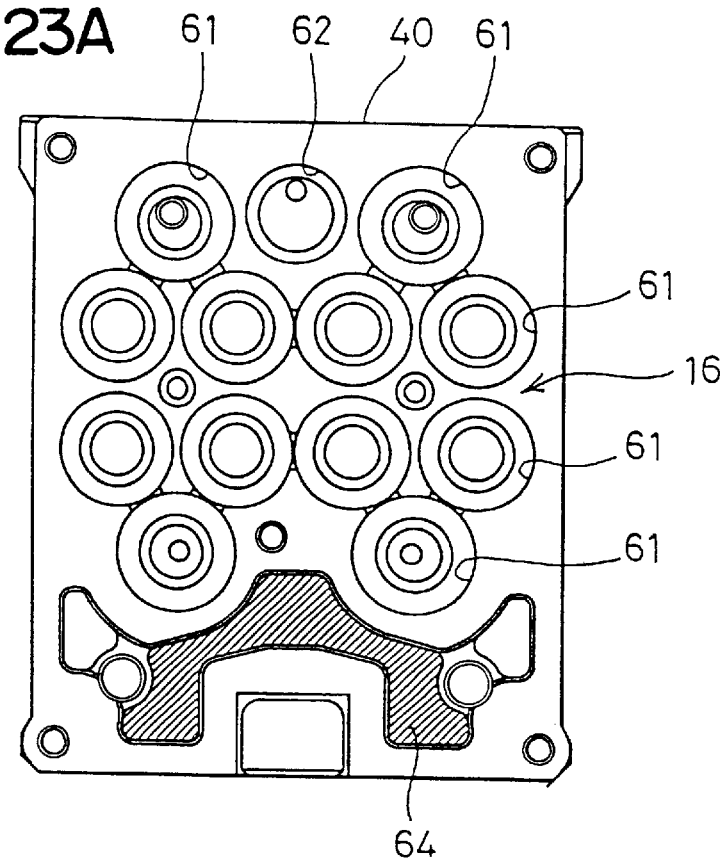
FIG. 23A is a left side view of a hydraulic unit of the fourth embodiment.
Figure 23B:
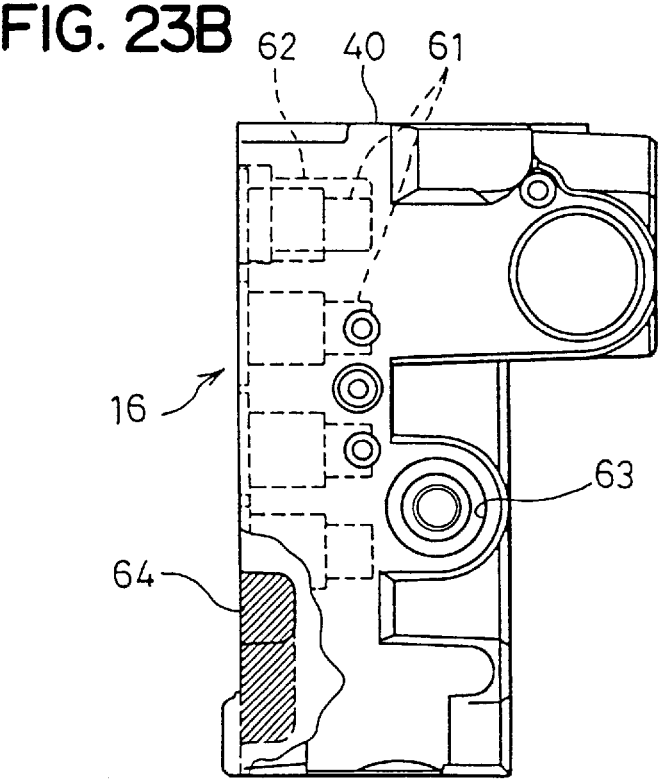
FIG. 23B is a plan view of the hydraulic unit of the fourth embodiment.

As shown FIGS. 23A, 23B, a hydraulic unit housing 40 is a substantially box-shaped tank made of aluminum alloy, and is provided with a hole 61 for accommodating a valve 5, a hole 62 for accommodating a pressure sensor 8 for detecting a condition of the hydraulic mechanism, and a hydraulic circuit 46. The valve 5, the pressure sensor 8 and the pump 2 are accommodated in the holes 61, 62 and 63, respectively.

Here, hatched portion corresponds to a channel groove 64, which is formed in a concave-shape. The channel groove 64 is formed during casting the hydraulic unit housing 40. Since the channel groove 64 is formed at a region where no parts or structure are originally formed, it may not restrict parts of the hydraulic unit housing 40 or arrangement or size of the holes or oil channels. An operation of the channel groove 64 will be explained later.

As shown in FIG. 15, the valve 15 is integrated with the solenoid 7 as an electronic actuator and constitutes a solenoid valve (electromagnetic valve). The valve 5 and the pressure sensor 8 are positioned so as to concentrate at a two-third region (valve arrange portion 16) from an upper side of the hydraulic unit housing 40. Here, the solenoid 7 (valve 5) and the pressure sensor 8 are fixed to the hydraulic unit housing 40 by caulking.

On the contrary, the motor driving circuit unit 2 is provided with a circuit unit housing 3, which has a box-shaped case portion 10 made of resin and a cover 11 made of resin for covering an left side opening of the case portion 10 (see FIGS. 15, 18).

An electronic substrate portion 6 for accommodating an electronic substrate 4 for controlling the motor operation, and an operation portion 9 for accommodating the solenoid 7 and the pressure sensor 8, are arranged in the circuit unit housing 3. Particularly, the electronic substrate portion 6 and the operation portion 9 are arranged in substantially parallel in a vertical direction in FIG. 15 so as to transversally offset. In other words, when the electronic substrate portion 6 and the operation portion 9 are projected to the hydraulic unit housing 40 (projected from a direction perpendicular to the vertical direction), each of the projections does not overlap.

Figure 20:
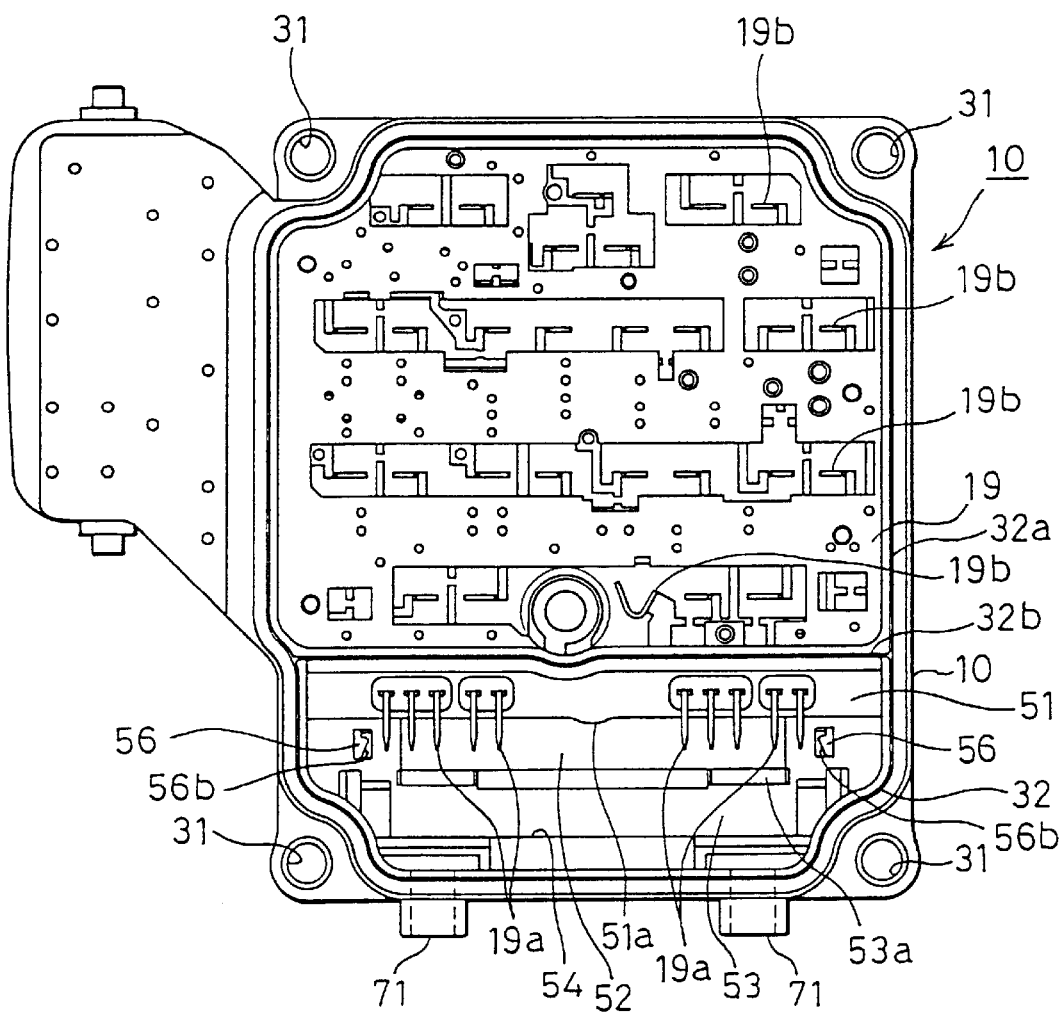
FIG. 20 is a plan view of a case portion of the hydraulic control apparatus of the fourth embodiment.
Figure 22:
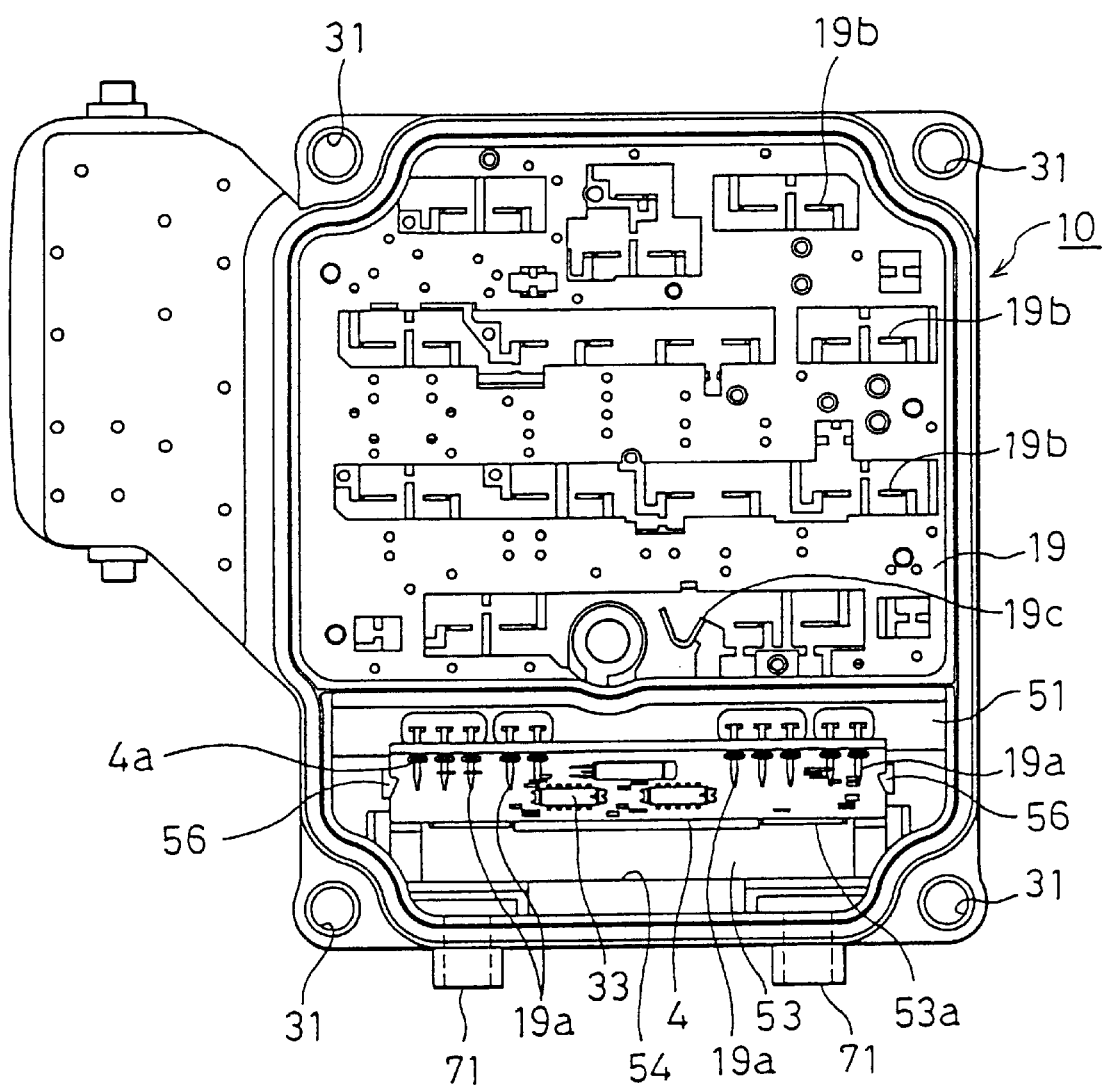
FIG. 22 is a plan view of a case portion when an electronic substrate is mounted.

As shown in FIGS. 20, 22, through holes 31 are provided at four corners of the case portion 10. The case portion 10 is fixed to the hydraulic unit housing 40 by screw members 29, which screw to the hydraulic unit housing 40 through the through holes 31.

As shown in FIG. 23B, a packing 70 including a large ring portion 70a and two small ring portions 70b along a outline of the operation portion 9 is fixed at a connection portion between the case portion 10 and the hydraulic unit housing 40.

As shown in FIGS. 20 and 22, a wall 32 having a substantially 8-shape is provided at an edge surface of the cover 11 of the case portion 10. The wall 32 has a peripheral portion 32a, which is along to a peripheral portion of the case portion 10, and a transverse portion 32b, which is along a boundary between the electronic substrate portion 6 and the operation portion 9. The cover 11 is bonded to the wall 32 at the peripheral portion 32a and the transverse portion 32b by vibrating welding.

Therefore, the case portion 10 and the cover 11 are integrated to form the circuit unit housing 3. The circuit unit housing 3 is fixed to the hydraulic unit housing 40 by the screw members 29. Since the case portion 10 and the cover 11 are integrated by welding, it can prevent liquid such as water from entering to inside of the circuit unit housing 3 through the connecting portion therebetween.

The operation portion 9 side in the case portion 10 of the circuit unit housing 3 is divided into a first block 15 at the cover 11 side and a second block 17 at the hydraulic unit 1 side by a partition wall 13, which substantially vertically extends.

A plurality of (two in the embodiment) bus bars 19 as a circuit pattern for large current is provided in the partition wall 13. The bus bar 19 is made of a conductive metal plate (such as copper plate) being processed by punching or bending. In this embodiment, the bus bar 19 is used as one part of the large current (12 V, 80 A), a solenoid current circuit, a pressure sensor circuit and so on.

A terminal 19a of the bus bar 19 for connecting with the substrate is extended to the electronic substrate portion 6 by protruded from the partition wall 13 so as to connect with the electronic substrate 4.

A terminal 19b of the bus bar 19 in the first block 15 is crooked toward perpendicular direction with respect to the partition wall 13, and is risen up from the main portion of the bus bar 19. The terminal 19b is used for connecting the bus bar 10 to the solenoid 7 or pressure sensor 8. A terminal 7a from the solenoid 7 or a terminal 8a from the pressure sensor 8 is resistance-welded.

Furthermore, an edge portion 19c for connecting to a motor positive terminal line 45 is provided (see FIGS. 20, 22), and the one end of the motor positive terminal line 45 is resistance-welded to the edge portion 19c. As shown in FIG. 18, the motor positive terminal line 45 is curved toward the electronic substrate portion 6 side from the operation portion 9, and reaches a motor 41 through the hydraulic unit housing 40 at the electronic substrate portion 6 side. That is, the motor positive terminal line 45 penetrates the hydraulic unit housing 40 by detouring around the valve arrange portion 16. Thus, the power can be supplied from the bus bar 19 to the motor 41 through the motor positive terminal line 45. Here, the ground of the motor 41 is connected a ground level through the hydraulic unit housing 40.

The electronic substrate portion 6 is also divided into the cover 11 side and the case portion 10 side as well as the operation portion 9. The electronic substrate portion 6 is different from the operation portion 9 in the structure that the cover 11 side and the case portion 10 side are not isolated by the partition wall or the like, that is the cover 11 side and the case portion 10 side are communicated each other as continuous space.

Figure 19:
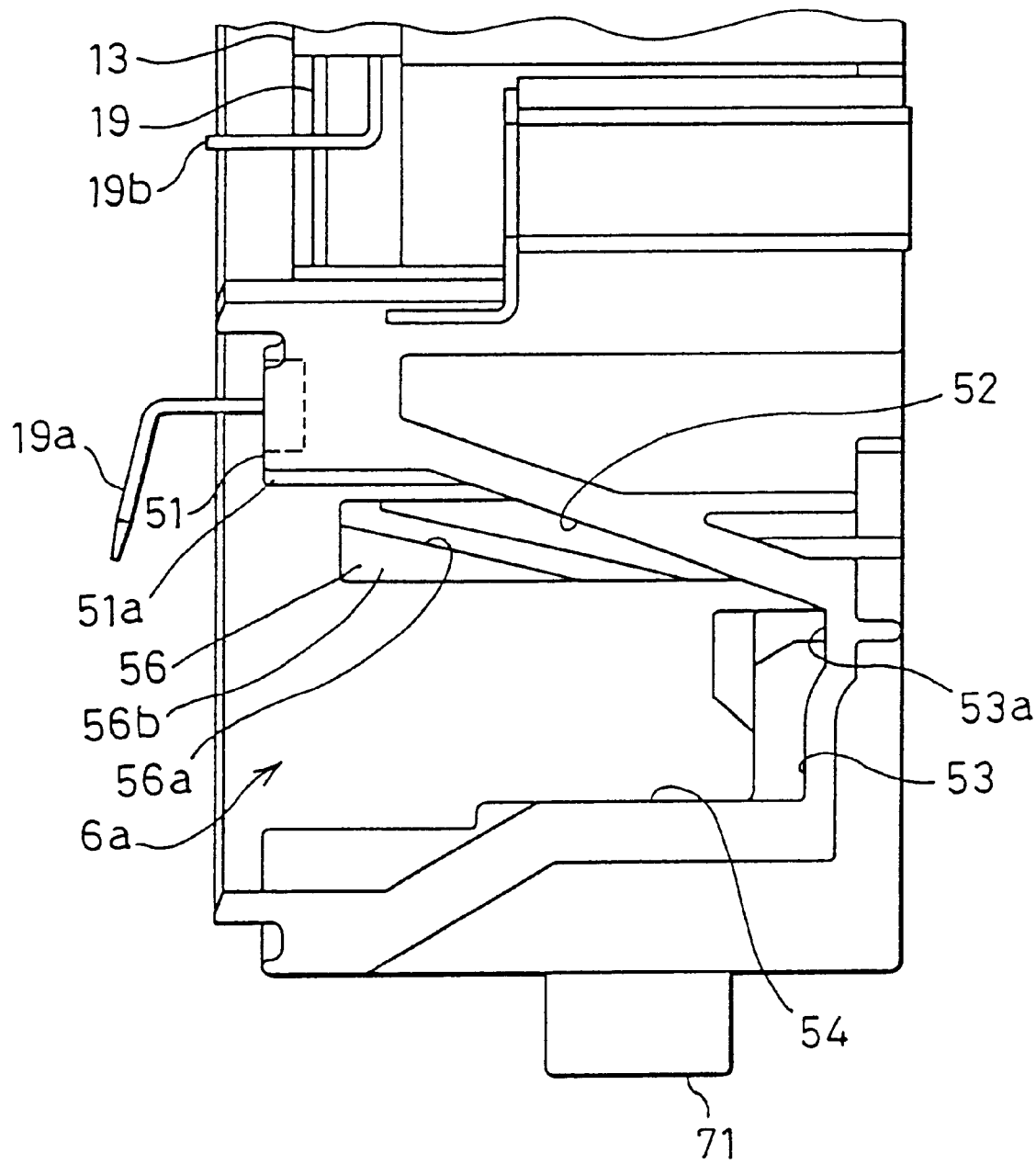
FIG. 19 is an expanded sectional view around a substrate chamber of the hydraulic control apparatus of the fourth embodiment.

As shown in FIGS. 19, 20, a substrate chamber 6a defined at the case portion 10 side of the electronic substrate portion 6 is provided with a terminal support portion 51 for supporting the edge portion 19a of the bus bar 19 and is also an extended portion of the partition wall 13; an oblique wall 52 continuously provided to the terminal support portion 51; a stepped wall 54 confronted with the stepped wall 52; bottom wall 53 provided between the oblique wall 52 and the stepped wall 54 and the like. The substrate chamber 6a has an opening only at the cover 11 side.

Therefore, in the case where the case portion 10 is bonded to the cover 11 (see FIG. 15, for instance), the electronic substrate portion 6 is sealed. Here, a ventilating port 12 is provided at one portion of the cover 11, which covers the electronic substrate portion 6, and has therein a filter, which transmits gas (air, vapor, etc) but interrupts liquid (water, etc). Therefore, the electronic substrate portion 6 is liquid-tight but not airtight. Thus, it can prevent temperature and moisture in the electronic substrate portion 6 from increasing due to ventilation through the ventilating port 12.

As shown in FIGS. 19 and 20, a center projection 51a is provided to the terminal support portion 51, and a concave portion 53a is provided at the bottom wall 53. Furthermore, a pair of snap-fits 56 as elastic hooking member is provided from the bottom wall 53 along to both side of the oblique wall 52 (FIG. 20).

Steps for accommodating the electronic substrate 4 into the substrate chamber 6a and fixing each other will be explained hereinafter. First of all, the electronic substrate 4 is inserted to the electrode chamber 6a along a direction perpendicular with respect to the bottom wall 53 so as to position one end of the electronic substrate 4 at the concave portion 53a. The electronic substrate 4 is moved (swung) so as to be fallen down to the oblique wall 52 side, so that a tip of the edge portion 19a of the bus bar 19 is inserted to corresponding hole contact 4a of the electronic substrate 4 (see FIG. 22). In this time, side portion of the electronic substrate 4 is contacted with a guidance surface 56b of the snap-fit 56. When pressure toward the oblique wall 52 is applied to the electronic substrate 4, the electronic substrate 4 is deformed so that it shoves the snap-fits 56 to both sides so as to pass between the snap-fits 56. Thus, the side portion of the electronic substrate 4 is hooked to the snap-fit, and the electronic substrate 4 is fixed.

Figure 21:
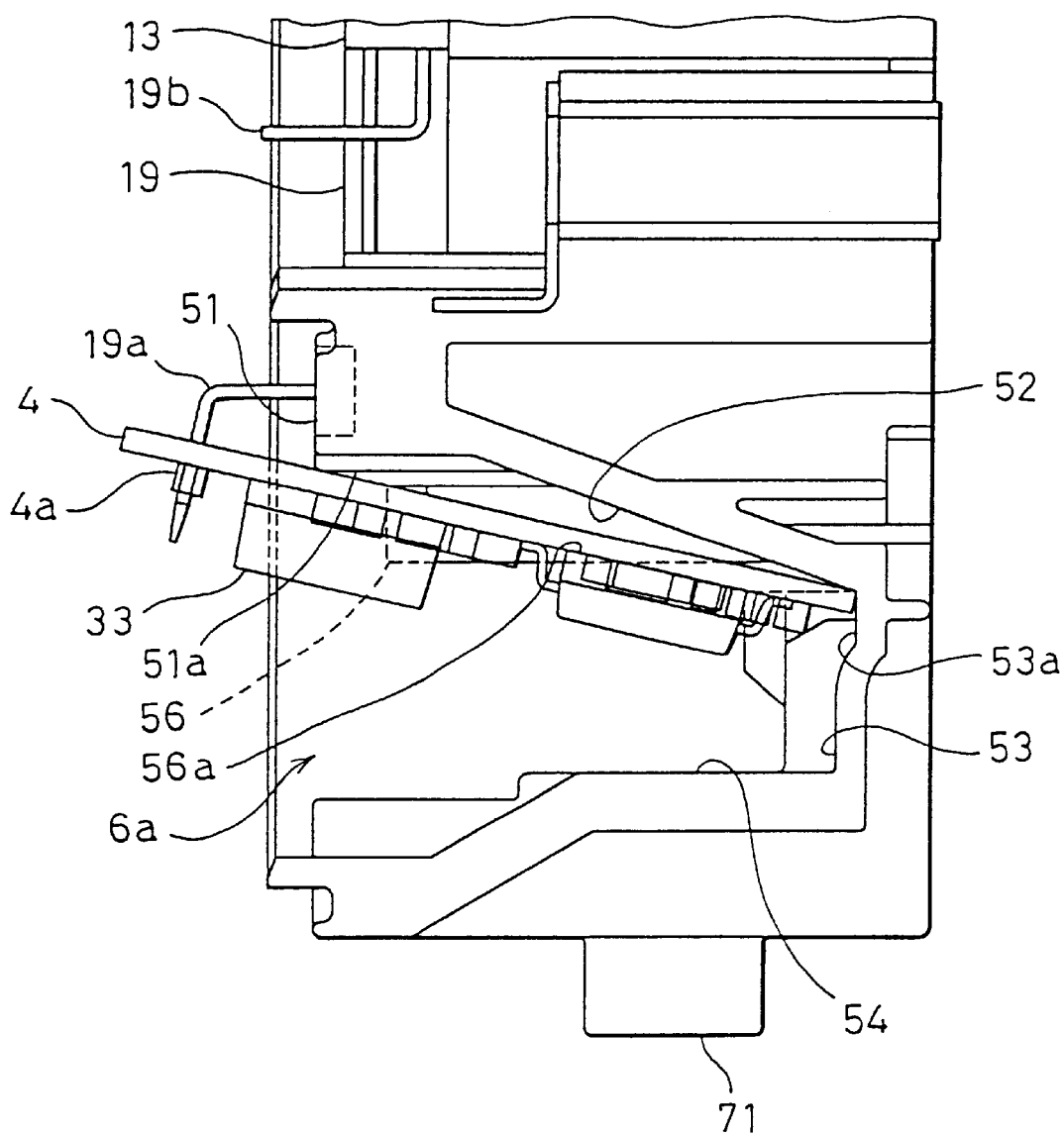
FIG. 21 is an expanded sectional view around the substrate chamber when an electronic substrate is mounted.

Furthermore, the edge portion 19a of the bus bar 19 is electrically connected by being penetrated through the hole contact 4a and being soldered therebetween. The edge portion 19a is extended toward a lower left oblique direction in FIGS. 19, 21, that is, a perpendicular to the electronic substrate 4 fixed by the snap-fits 56. Thus, a swing direction of the electronic substrate 4 is substantially along the extending direction of the edge portion 19a, and it can prevent the connecting portions from being applied excessive force.

When the electronic substrate 4 is hooked by the snap-fits 56, a back surface of the electronic substrate 4 is contacted with the center projection 51a of the terminal support portion 51, and the electronic substrate 4 is elastically deformed like an arch so that around the center projection becomes convex. Therefore, the electronic substrate 4 is firmly fixed by elasticity applied to the snap-fits 56. Furthermore, since a back surface 56a of the snap-fit 56 contacts with the electronic substrate 4 at wide area, the electronic substrate 4 is further stable.

Figure 24A:
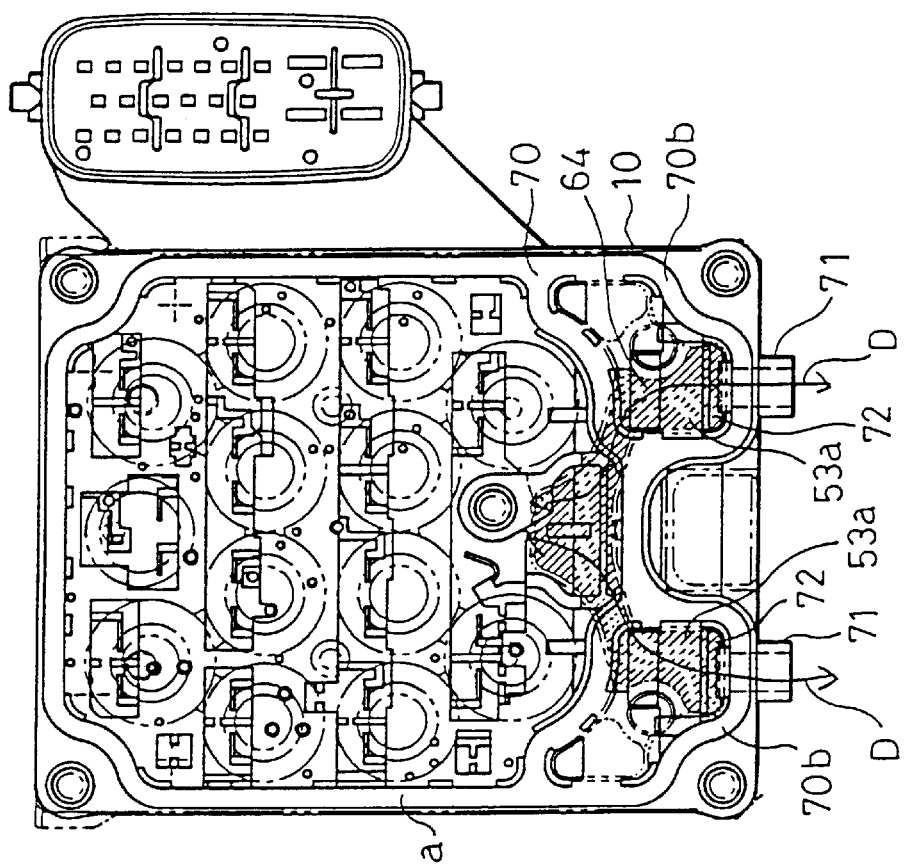
FIG. 24A is a partly sectional fragmentary view of the hydraulic control apparatus when the case portion is mounted on the hydraulic unit, for illustrating a drain path.
Figure 24B:
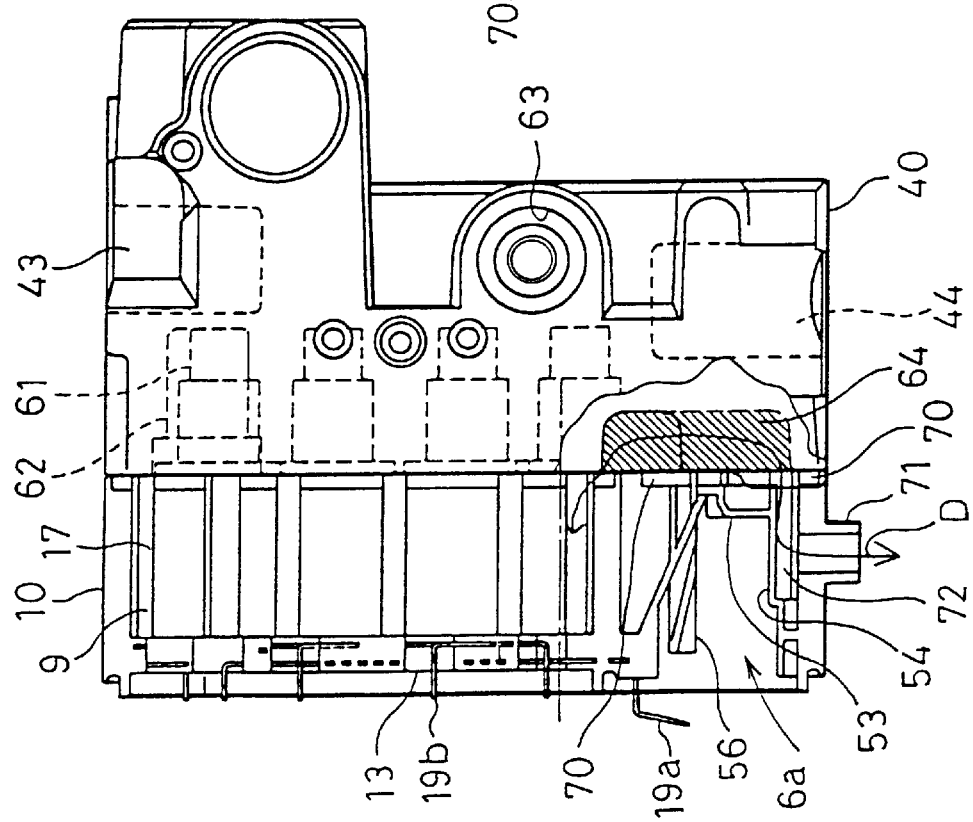
FIG. 24B is a perspective view of the hydraulic control apparatus shown in FIG. 24A from the hydraulic unit side.

As shown in FIGS. 15, 17, 24A, 24B, a communication chamber 72 is provided at the back of the stepped wall 54. The communication chamber 72 is opened to the external air through a nozzle 71 corresponding to a ventilating opening. As shown in FIGS. 24A, 24B, the communication chamber 72 has an opening at the hydraulic unit housing 40, which communicates with the channel groove 64. Furthermore, an innermost portion of the channel groove 64 communicates with the operation portion 9 (the second block 17) of the case portion 10. Hence, a series of path (shown as a path D in FIGS. 24A, 24B), that is, the nozzle 71—the communication chamber 72—the channel groove 64—the operation portion 9, is defined.

The nozzle 71 positions at the lowermost portion when this hydraulic control apparatus operates (is mounted on the vehicle). Here, diameters (sizes) of the nozzle 71, communication chamber 72 and the channel groove 64 are set so as to prevent water drops moving along the path D from closing the path D due to surface tension. Therefore, when there are water drops in the operation portion 9, the water drops is externally drained from the nozzle 71 through the path D.

Here, it is thought that a main factor of the water drops is condensation due to temperature changing in the operation portion 9 (the temperature rises when the hydraulic control apparatus operates, and drops when the hydraulic control apparatus stops) or flooding due to inundation. Here, it is difficult to completely prevent the flooding. However, it can be preferably prevent the condensation due to the temperature changing, because: the diameter of the path D is designed as described the above; ventilation between the operation portion 9 and the external is excellent since the number of the path D is two; and the operation portion 9 is always ventilated.

In other wards, it can sufficiently prevent the condensation during a normal use, and can drain the water drops immediately without fail even if the water drops are generated in the operation chamber 9 as a result of the condensation or flooding. Therefore, it can prevent breakdown, rust or erosion due to the water drops.

The hydraulic control apparatus integrated with motor circuit unit is assembled by, for example, the following steps.

First of all, the motor 41, the pump 42, the valve 5 (integrated with the solenoid 7), the pressure sensor 8 and the like are assembled to the hydraulic unit housing 40. The motor positive terminal line 45 is connected to the motor 41 through the hydraulic unit housing 40. That is, the hydraulic unit 1 is previously assembled.

Next, the case portion 10 is positioned above the top surface of the hydraulic unit housing 40 so that the solenoid 7 and the pressure sensor 8 are accommodated in the second block 17 of the case portion 10. As a result, the edge portion 19 of the bus bar 19 is approached or contacted with the terminals 7a, 8a of the solenoid 7 and the pressure sensor 8. Here, the bus bar 19 is integrally assembled in the partition wall 13 of the case portion 10 when the case portion 10 is manufactured.

Next, the screw members 29 are inserted into the through holes 31 of the case portion 10, and the screw members 29 are screwed so as to being screwed to not-shown screw holes of the hydraulic unit housing 40. As a result, the case portion 10 is fixed at the top surface of the hydraulic unit housing 40.

Next, the edge portion 19b of the bus bar 19 is electrically connected to the terminals 7a, 8a of the solenoid 7 and the pressure sensor 8 by bonding with the resistance welding, and the edge portion 19c of the bus bar 19 is electrically connected to an edge of the motor positive terminal line 45 by bonding with the resistance welding.

Next, the electronic substrate 4 is mounted as described the above. After that, the cover 11 is putted on the case portion 10 so as to cover the upper surface of the case portion 10, and is integrated by bonding the case portion 10 and the cover 11 by using the vibrating welding. Thus, the hydraulic control apparatus integrated with motor circuit unit in which the hydraulic unit 1 and the motor driving circuit unit 2 is integrated is completed.

Here, it may be applied to the following assembling steps.

That is, first of all, the electronic substrate 4 is assembled and soldered to the electronic substrate portion 6 of the case portion 10.

On the contrary, the hydraulic unit 1 is separately completed previously. Next, the case portion 10 is positioned above the top surface of the hydraulic unit housing 40 so that the solenoid 7 and the pressure sensor 8 are accommodated in the second block 17 of the case portion 10.

Next, the screw members 29 are inserted into the through holes 31 of the case portion 10, and the screw members 29 are screwed so as to being screwed to not-shown screw holes of the hydraulic unit housing 40. As a result, the case portion 10 is fixed at the top surface of the hydraulic unit housing 40.

Next, the edge portion 19b of the bus bar 19 is electrically connected to the terminals 7a, 8a of the solenoid 7 and the pressure sensor 8 by bonding with the resistance welding, and the edge portion 19c of the bus bar 19 is electrically connected to an edge of the motor positive terminal line 45 by bonding with the resistance welding.

After that, the cover 11 is putted on the case portion 10 so as to cover the upper surface of the case portion 10, and is integrated by bonding the case portion 10 and the cover 11 by using the vibrating welding. Thus, the hydraulic control apparatus integrated with motor circuit unit in which the hydraulic unit 1 and the motor driving circuit unit 2 is integrated is completed.

According to this embodiment, the operation portion 9, in which the solenoid 7 and the pressure sensor 8 are accommodated, and the electronic substrate portion 6, in which the electronic substrate 4 is accommodated, are arranged so as to transversally offset. Therefore, the operation portion 9 and the electronic substrate portion 6 can be manufactured separately. Thus, the flexibility of the manufacture increases.

According to this embodiment, since the hydraulic unit housing 40 has the valve arrange portion 16 in which the valve as a part of the hydraulic mechanism is concentrated and arranged, a distance between both valves 5, for example, is reduced. Furthermore, since a space is effectively used compared to that of the case where the valve 5 is dispersively arranged, it can be downsized.

Particularly, because motor positive terminal line 45 is detoured around the valve arrange portion 16, it dose not need to provide an additional space in the valve arrange portion 16 compared to the case where the motor positive terminal line 45 is penetrated through the valve arrange portion 16. Therefore, it can further concentrate the arrangement of the valve 15 in the valve arrange portion 16 as high as possible.

Furthermore, the motor positive terminal line 45 penetrates the hydraulic unit housing 40 at the electronic substrate portion 6 side, reaches to the operation portion 9 by bypassing the electronic substrate portion 6, and is connected with the bus bar 19 at the operation 9 side. Therefore, almost all the bus bar 19 (except of the edge portion 19a for connecting with the electronic substrate 4) can be arranged (concentrated) at the operation portion 9. Therefore, the large current circuit can be downsized.

Since the operation portion 9 and the electronic substrate portion 6 are arranged in the circuit unit housing 3 so as to transversally offset each other, a connecting step for connecting the solenoid or the like with the bus bar 19 in the operation portion 9 can be separately performed from a assembling step for assembling the electronic substrate 4 to the electronic substrate portion 6. For example, the bus bar 19 may be connected before the electronic substrate 4 is assembled, or vice versa. Thus, the flexibility of the manufacture increases; and the productivity can be increased as a result.

Furthermore, since the electronic substrate 4 is obliquely arranged in the electronic substrate portion 6 with respect to the vertical direction, an arrangement area of the electronic substrate 4 is lowered compared to the case where the electronic substrate 4 is arranged in parallel to the vertical direction. Therefore, the hydraulic control apparatus integrated with motor circuit unit can be downsized. Particularly, the size in the vertical direction can be reduced.

The manufacturing steps can be simplified and reduced, because the electronic substrate 4 is fixed by using the snap-fits 56, and is easily hooked to the snap-fits 56 only by inserting the electronic substrate 4 to the substrate chamber 6a and by swing it. Since it does not need screws, it does not need a space to which a tool for the screws is inserted. Therefore, the electrode chamber 6a or the hydraulic control apparatus integrated with motor circuit unit can be downsized.

Furthermore, the edge portion 19a of the bus bar 19 to be connected with the electronic substrate 4 is extended vertically to the electronic substrate 4 fixed by the snap-fits 56. Therefore, a swing direction of the electronic substrate 4 is substantially along the extending direction of the edge portion 19a, and it can prevent the connecting portions from being applied excessive force.

In addition, since the channel groove 64 is provided in the hydraulic unit housing 40 and is used as a part of the path D for ventilating and draining the operation portion 9, it does not need to provide a space corresponding to the channel groove 64 in the circuit unit housing 3. Therefore, the circuit unit housing 3 or the hydraulic control apparatus integrated with motor circuit unit can be downsized.

Furthermore, the communication chamber 72 is provided along the bottom wall of the lowermost portion of the circuit unit housing 3, and is communicated with the channel groove 64 at the bottom side of the substrate chamber 6a, a depth of the substrate chamber 6a can be enlarged. As a result, since almost all the electronic substrate 4 is accommodated in the substrate chamber 6a (an amount of projection to of the electronic substrate 4 to the cover 11 side can be reduced), an amount of enlargement (toward left side in FIGS. 15, 19) at the electronic substrate portion 6 can be reduced. Therefore, the circuit unit housing 3 or the hydraulic control apparatus integrated with motor circuit unit can be downsized.

In addition, since a labyrinth is defined by the nozzle 71, the communication chamber 72 and the channel groove 64, it can prevent the operation portion 9 from immediately soaking even if the hydraulic control apparatus is soaked in water. That is, it has excellent waterproof in such a case.

Since the channel groove 64 is formed at a region where no parts or structure are originally formed, it may not restrict parts of the hydraulic unit housing 40 or arrangement or size of the holes or oil channels. That is non-used space is effectively used. Furthermore, since the channel groove 64 is formed during casing the hydraulic unit housing 40, no additional steps for providing the channel groove 64 such as cutting like drilling are needed. That is, it may only design a cast to providing the channel groove 64, and it can prevent cost from increasing. Furthermore, since an amount of metal (e.g., aluminum alloy) per one hydraulic unit housing 40 reduces by providing the channel groove 64, it can prevent cost from increasing on the basis on material cost, and can save natural resources.

Furthermore, according to the manufacturing steps of this embodiment, the edge portion 19c for motor can be easily connected with the motor positive terminal line 45 without fail, because the steps includes: at least the motor 41 and the motor positive terminal line 45 is connected to the hydraulic unit housing 40; after that, the case portion 10 of the circuit unit housing 3 is assembled to the hydraulic unit housing 40; and then the edge portion 19c for motor is welded with the motor positive terminal line 45.

Thus, the present invention is explained with reference to various embodiments, however, the present invention is not limited to such the embodiments, and can be applied to the other structure.

What is claimed is:

1. A method of manufacturing a hydraulic control apparatus comprising:
    a hydraulic unit for accommodating a hydraulic mechanism for adjusting brake fluid pressure to be used for vehicle controlling; and
    an actuator driving circuit unit integrally assembled with the hydraulic unit, having a circuit unit housing including:

an operation portion for accommodating an electronic control actuator for controlling the hydraulic mechanism; and an electronic substrate portion for being separated from the operation portion, and for accommodating an electronic substrate for controlling a brake fluid pressure generating actuator, wherein the circuit unit housing is made up of a case fixed to a hydraulic unit housing of the hydraulic unit and a cover for covering the case, the method comprising:

superimposing an edge portion of the cover on an edge of the case; and bonding the case and the cover by using vibrating welding by vibrating at least one of the case and the cover, wherein the edge portion of the case has an inside convex portion to be bonded with the cover and an outside convex portion shorter than the inside convex portion formed adjacent to the inside convex portion with a concave portion interposed therebetween over the whole bonding portion.

2. The method according to claim 1, wherein the edge portion of the case and the edge portion of the cover are formed in a common flat surface over a whole bonding portion.

3. The method according to claim 1, wherein the edge portion of the cover has a zonal flat portion over the whole bonding portion.

4. A hydraulic control apparatus comprising:

a hydraulic unit for accommodating a hydraulic mechanism for adjusting brake fluid pressure to be used for vehicle controlling; and an actuator driving circuit unit integrally assembled with the hydraulic unit, having a circuit unit housing including:

an operation portion for accommodating an electronic control actuator for controlling the hydraulic mechanism; and an electronic substrate portion for being arranged to be transversally offset with respect to the operation portion, and for accommodating an electronic substrate for controlling a brake fluid pressure generating actuator, wherein the housing includes a bus bar capable of supplying large current to the operation portion and the electronic substrate portion, wherein the electronic substrate portion further includes an electronic element to be electrically connected to the bus bar, wherein the electronic substrate and the electronic element are arranged in the electronic substrate portion so as to offset in a vertical direction each other.

5. A hydraulic control apparatus comprising:

a hydraulic unit for accommodating a hydraulic mechanism for adjusting brake fluid pressure to be used for vehicle controlling; and an actuator driving circuit unit integrally assembled with the hydraulic unit, having a circuit unit housing including:

an operation portion for accommodating an electronic control actuator for controlling the hydraulic mechanism; and an electronic substrate portion for being arranged to be transversally offset with respect to the operation portion, and for accommodating an electronic substrate for controlling a brake fluid pressure generating actuator, wherein the housing includes a bus bar capable of supplying large current to the operation portion and the electronic substrate portion, wherein the operation portion includes an assembling terminal where the bus bar is arranged, and the bus bar is electrically connected to the electronic control actuator.

6. The apparatus according to claim 5, wherein the circuit unit housing is made up of a case fixed to a hydraulic unit housing of the hydraulic unit and a cover for covering the case.

7. The apparatus according to claim 5, wherein the electronic control actuator is fixed to a hydraulic unit housing of the hydraulic unit by caulking.

8. A method of manufacturing a hydraulic control apparatus comprising:

a hydraulic unit for accommodating a hydraulic mechanism for adjusting brake fluid pressure to be used for vehicle controlling; and an actuator driving circuit unit integrally assembled with the hydraulic unit, having a circuit unit housing including:

an operation portion for accommodating an electronic control actuator for controlling the hydraulic mechanism; and an electronic substrate portion for being arranged to be transversally offset with respect to the operation portion, and for accommodating an electronic substrate for controlling a brake fluid pressure generating actuator, wherein the circuit unit housing is made up of a case fixed to a hydraulic unit housing of the hydraulic unit and a cover for covering the case, the method comprising:

fixing the case of the circuit unit housing to the hydraulic unit housing; and assembling the electronic substrate to the case, wherein, after the electronic substrate is assembled to the case, further comprising:

spreading dripproof agent on the electronic substrate; and drying the dripproof agent.

9. The method according to claim 8, wherein the case of the circuit unit housing is fixed to the hydraulic unit housing before the electronic substrate is assembled to the case.

10. The method according to claim 8, wherein the case of the circuit unit housing is fixed to the hydraulic unit housing after the electronic substrate is assembled to the case.

11. The method according to claim 8, wherein, after the case of the circuit unit housing is fixed to the hydraulic unit housing, further comprising: connecting a bus bar provided in the case with the electronic control actuator.

12. The method according to claim 8, wherein, the dripproof agent is dried with the electronic substrate being mounted on the case.

13. A hydraulic control apparatus comprising:

a hydraulic unit having a hydraulic unit housing for accommodating a hydraulic mechanism including valves for adjusting brake fluid pressure to be used for vehicle controlling, the hydraulic unit housing including a valve arrange portion at which the valves are concentrated; and an actuator driving circuit unit integrally assembled with the hydraulic unit, having a circuit unit housing including:

an operation portion for accommodating an electronic control actuator for controlling the hydraulic mechanism;

an electronic substrate portion for being separated from the operation portion, and for accommodating an electronic substrate for controlling a brake fluid pressure generating actuator; and a terminal line connected to the brake fluid pressure generating actuator by being penetrated through the hydraulic unit housing, and having a shape to detour around the valve arrange portion of the hydraulic unit housing, wherein:
the operation portion is arranged so as to substantially confront with the valve arrange portion;
the electronic substrate portion is arranged to be transversally offset with respect to the operation portion; and
the terminal line has a shape to penetrate through the hydraulic unit housing at an electronic substrate portion side and to extend to the operation portion by detouring around the electronic substrate portion.

14. A hydraulic control apparatus comprising:
a hydraulic unit for accommodating a hydraulic mechanism for adjusting brake fluid pressure to be used for vehicle controlling; and
an actuator driving circuit unit integrally assembled with the hydraulic unit, having a circuit unit housing including:
an operation portion for accommodating an electronic control actuator for controlling the hydraulic mechanism; and
an electronic substrate portion for being arranged to be transversally offset with respect to the operation portion, and for accommodating an electronic substrate for controlling a brake fluid pressure generating actuator, and the electronic substrate being arranged obliquely with respect to a vertical direction or perpendicularly to the vertical direction,
wherein the hydraulic unit has a hydraulic unit housing for accommodating the hydraulic mechanism including valves, and the hydraulic unit housing includes a valve arrange portion at which the valves are concentrated; and
the actuator driving circuit unit further includes a terminal line connected to the brake fluid pressure generating actuator by being penetrated through the hydraulic unit housing, and having a shape to detour around the valve arrange portion of the hydraulic unit housing, and
wherein:
the operation portion is arranged so as to substantially confront with the valve arrange portion;
the electronic substrate portion is arranged to be transversally offset with respect to the operation portion; and
the terminal line has a shape to penetrate through the hydraulic unit housing at an electronic substrate portion side and to extend to the operation portion by detouring around the electronic substrate portion.

15. A hydraulic control apparatus comprising:
a hydraulic unit for accommodating a hydraulic mechanism for adjusting brake fluid pressure to be used for vehicle controlling; and
an actuator driving circuit unit integrally assembled with the hydraulic unit, having a circuit unit housing including:

an operation portion for accommodating an electronic control actuator for controlling the hydraulic mechanism; and
an electronic substrate portion for being arranged to be transversally offset with respect to the operation portion, and for accommodating an electronic substrate for controlling a brake fluid pressure generating actuator, and the electronic substrate being arranged obliquely with respect to a vertical direction or perpendicularly to the vertical direction,
wherein the electronic substrate portion has an elastic hooking member for supporting the electronic substrate by being elastically deformed.

16. A hydraulic control apparatus comprising:
a hydraulic unit for accommodating a hydraulic mechanism for adjusting brake fluid pressure to be used for vehicle controlling; and
an actuator driving circuit unit integrally assembled with the hydraulic unit, having a circuit unit housing including:
an operation portion for accommodating an electronic control actuator for controlling the hydraulic mechanism; and
an electronic substrate portion for being arranged to be transversally offset with respect to the operation portion, and for accommodating an electronic substrate for controlling a brake fluid pressure generating actuator, and the electronic substrate being arranged obliquely with respect to a vertical direction or perpendicularly to the vertical direction, and
a substrate terminal for connecting the electronic substrate with a current supplying circuit, which supplies current to the brake fluid pressure generating actuator, and being extended to a direction substantially perpendicularly penetrating the electronic substrate fixed in the electronic substrate portion.

17. A method of manufacturing a hydraulic control apparatus comprising:
a hydraulic unit having a hydraulic unit housing for accommodating a hydraulic mechanism including valves for adjusting brake fluid pressure to be used for vehicle controlling, the hydraulic unit housing including a valve arrange portion at which the valves are concentrated; and
an actuator driving circuit unit integrally assembled with the hydraulic unit, having a circuit unit housing including:
an operation portion for accommodating an electronic control actuator for controlling the hydraulic mechanism;
an electronic substrate portion for being separated from the operation portion, and for accommodating an electronic substrate for controlling a brake fluid pressure generating actuator; and
a terminal line connected to the brake fluid pressure generating actuator by being penetrated through the hydraulic unit housing, and having a shape to detour around the valve arrange portion of the hydraulic unit housing,
the method comprising:
connecting the brake fluid pressure generating actuator and the terminal line to the hydraulic unit housing;
assembling a case of the circuit unit housing with the hydraulic unit housing; and
welding the terminal line with a brake fluid pressure generating actuator terminal of a current supplying circuit, which supplies current to the brake fluid pressure generating actuator.

18. A hydraulic control apparatus comprising:

a hydraulic unit for accommodating a hydraulic mechanism for adjusting brake fluid pressure to be used for vehicle controlling; and an actuator driving circuit unit integrally assembled with the hydraulic unit, having a circuit unit housing including:

an operation portion for accommodating an electronic control actuator for controlling the hydraulic mechanism; and an electronic substrate portion for accommodating an electronic substrate for controlling a brake fluid pressure generating actuator, wherein the hydraulic unit has a channel groove at a portion where the circuit unit housing is confronted with in the hydraulic unit, the channel groove is partly opened to the operation portion and is directly or indirectly communicated with a ventilating opening positioned at a bottom surface of the hydraulic control apparatus.

19. The apparatus according to claim 18, wherein:

the ventilating opening is further formed at a bottom surface of the circuit unit housing that positions lower side when the hydraulic control apparatus is used, and further comprises a communication chamber at the circuit unit housing for communicating the ventilating opening with the channel groove.

20. The apparatus according to claim 19, wherein:

the communication chamber is formed along a wall of a bottom surface that positions lower side when the hydraulic control apparatus is used, and the electronic substrate portion is adjacently arranged above the communication chamber when the hydraulic control apparatus is used.

21. The apparatus according to claim 20, wherein the electronic substrate is arranged obliquely with respect to a vertical direction or perpendicularly to the vertical direction.

22. The apparatus according to claim 21, wherein the electronic substrate portion has an elastic hooking member for supporting the electronic substrate by being elastically deformed.

23. The apparatus according to claim 22, further comprising a substrate terminal for connecting the electronic substrate with a current supplying circuit, which supplies current to the brake fluid pressure generating actuator, and being extended to a direction substantially perpendicularly penetrating the electronic substrate fixed in the electronic substrate portion.

24. The apparatus according to claim 18, wherein the electronic substrate portion is arranged to be transversally offset with respect to the operation portion.

25. A hydraulic control apparatus comprising:

a hydraulic unit for accommodating a hydraulic mechanism for adjusting brake fluid pressure to be used for vehicle controlling; and an actuator driving circuit unit integrally assembled with the hydraulic unit, having a circuit unit housing including;

an operation portion for accommodating an electronic control actuator for controlling the hydraulic mechanism; and an electronic substrate portion for being separated from the operation portion, and for accommodating an electronic substrate for controlling a brake fluid pressure generating actuator, wherein the hydraulic unit has a channel groove at a portion where the circuit unit housing is confronted with in the hydraulic unit, the channel groove is partly opened to the operation portion and is directly or indirectly communicated with a ventilating opening positioned at a bottom surface of the hydraulic control apparatus.

26. The apparatus according to claim 25, wherein the electronic substrate portion is arranged to be transversally offset with respect to the operation portion.

27. The apparatus according to claim 26, wherein:

the hydraulic unit having a hydraulic unit housing for accommodating the hydraulic mechanism including valves, and the hydraulic unit housing including a valve arrange portion at which the valves are concentrated; and the actuator driving circuit unit further includes a terminal line connected to the brake fluid pressure generating actuator by being penetrated through the hydraulic unit housing, and having a shape to detour around the valve arrange portion of the hydraulic unit housing.

28. The apparatus according to claim 27, wherein the electronic substrate is arranged obliquely with respect to a vertical direction or perpendicularly to the vertical direction.

* * * * *